US009124446B2

(12) United States Patent
Vanderah et al.

(10) Patent No.: US 9,124,446 B2
(45) Date of Patent: Sep. 1, 2015

(54) METHODS AND APPARATUS TO IMPLEMENT A REMOTE TERMINAL UNIT NETWORK

(71) Applicant: Bristol, Inc., Watertown, CT (US)

(72) Inventors: Richard Joseph Vanderah, Marshalltown, IA (US); David Lee Smid, Marshalltown, IA (US); Rickie Lee Condit, Marshalltown, IA (US)

(73) Assignee: BRISTOL, INC., Watertown, CT (US)

( * ) Notice: Subject to any disclaimer, the term of this patent is extended or adjusted under 35 U.S.C. 154(b) by 91 days.

(21) Appl. No.: 13/631,357

(22) Filed: Sep. 28, 2012

(65) Prior Publication Data

US 2014/0092083 A1 Apr. 3, 2014

(51) Int. Cl.
*H04W 8/00* (2009.01)
*H04L 12/403* (2006.01)
(Continued)

(52) U.S. Cl.
CPC ........ *H04L 12/4035* (2013.01); *H04L 12/2809* (2013.01); *H04L 29/08396* (2013.01); *H04W 8/005* (2013.01); *H04W 72/0446* (2013.01); *H04W 74/0825* (2013.01); *H04W 74/0858* (2013.01); *H04L 2012/4026* (2013.01)

(58) Field of Classification Search
CPC ... H04W 72/02; H04W 72/0446; H04W 8/00; H04W 40/24; H04W 40/246; H04W 48/08; H04W 48/16; H04W 74/08–74/0891; H04W 8/005; H04L 2012/2803; H04L 2012/40221; H04L 2012/40228; H04L 29/08648; H04L 29/0899; H04L 2012/40208–2012/4026; H04L 12/40065; H04L 12/2809; H04L 29/08396–29/08411; H04L 29/08405

USPC .......... 370/310–330, 442–463, 395.2, 395.4, 370/395.41, 395.3
See application file for complete search history.

(56) References Cited

U.S. PATENT DOCUMENTS 5,339,425 A   8/1994 Vanderah et al.
5,901,323 A   5/1999 Milliken et al.
(Continued)

FOREIGN PATENT DOCUMENTS

EP   0490864 A1   6/1992
WO   WO 2012055430   *   5/2012   ............ H04W 16/00

OTHER PUBLICATIONS

"Instructions for the FP-5000 Modbus RTU Communications Board", Sep. 2005, Eaton—Cutler-Hammer, I.L. 02602002E, 11 Pages.*

(Continued)

*Primary Examiner* — Edan Orgad
*Assistant Examiner* — Ivan O Latorre
(74) *Attorney, Agent, or Firm* — Hanley, Flight & Zimmerman, LLC

(57) ABSTRACT

Methods and apparatus to implement a remote terminal unit network are disclosed. An example method involves allocating, via a processor of a first remote terminal unit, a first time slot of a first frame of a first transmission schedule to the first remote terminal unit, the first remote terminal unit to be in communication with a second remote terminal unit in a network associated with a process control system and to be in communication with a host of the process control system, the first remote terminal unit to communicate first data over the network during the first time slot, and allocating, via the processor, a second time slot of the first frame to the second remote terminal unit, the second remote terminal unit to communicate second data over the network during the second time slot.

34 Claims, 17 Drawing Sheets

(51) Int. Cl.
*H04L 12/28* (2006.01)
*H04L 29/08* (2006.01)
*H04W 74/08* (2009.01)
*H04W 72/04* (2009.01)
*H04L 12/40* (2006.01)

(56) References Cited

U.S. PATENT DOCUMENTS

| | | | |
|---|---|---|---|
| 6,868,072 B1* | 3/2005 | Lin et al. | 370/276 |
| 6,903,659 B2 | 6/2005 | Vanderah et al. | |
| 7,049,975 B2 | 5/2006 | Vanderah et al. | |
| 7,064,671 B2 | 6/2006 | Vanderah et al. | |
| 7,190,686 B1* | 3/2007 | Beals | 370/337 |
| 7,941,489 B2 | 5/2011 | LaMothe et al. | |
| 8,144,028 B2 | 3/2012 | LaMothe et al. | |
| 2002/0161866 A1 | 10/2002 | Tozer et al. | |
| 2003/0177216 A1* | 9/2003 | Sutherland et al. | 709/223 |
| 2003/0198245 A1* | 10/2003 | Bradford et al. | 370/445 |
| 2004/0170134 A1* | 9/2004 | Furuyama et al. | 370/310 |
| 2006/0215583 A1 | 9/2006 | Castagnoli | |
| 2007/0054670 A1 | 3/2007 | Kalika et al. | |
| 2007/0076650 A1* | 4/2007 | Manjeshwar et al. | 370/328 |
| 2007/0280285 A1 | 12/2007 | Vanderah et al. | |
| 2008/0273518 A1* | 11/2008 | Pratt et al. | 370/345 |
| 2009/0034421 A1* | 2/2009 | Kodama et al. | 370/242 |
| 2009/0046675 A1* | 2/2009 | Pratt et al. | 370/337 |
| 2009/0059814 A1* | 3/2009 | Nixon et al. | 370/254 |
| 2009/0257420 A1* | 10/2009 | Kore et al. | 370/345 |
| 2009/0296602 A1* | 12/2009 | Bange et al. | 370/254 |
| 2011/0164512 A1* | 7/2011 | Citrano et al. | 370/252 |
| 2012/0224568 A1* | 9/2012 | Freda et al. | 370/338 |
| 2013/0103780 A1* | 4/2013 | Panther | 709/213 |

OTHER PUBLICATIONS

International Searching Authority, "International Search Report", issued in connection with PCT Application No. PCT/US2013/062130, mailed on Feb. 25, 2014, 5 pages.

International Searching Authority, "Written Opinion", issued in connection with PCT Application No. PCT/US2013/062130, mailed on Feb. 25, 2014, 11 pages.

International Searching Authority, "International Preliminary Report on Patentability," issued in connection with PCT Application No. PCT/US2013/062130, issued on Mar. 31, 2015, 13 pages.

* cited by examiner

METHODS AND APPARATUS TO IMPLEMENT A REMOTE TERMINAL UNIT NETWORK

FIELD OF THE DISCLOSURE

This disclosure relates generally to process control systems and, more particularly, to methods and apparatus to implement a remote terminal unit network.

BACKGROUND

Industrial control systems, like those used in the oil and gas production industry, frequently include one or more remote terminal units (RTUs) as key components in an operating process unit of a control system (e.g., at a wellhead oil production site). RTUs are used to interface a control system host with field devices (e.g., valves, valve positioners, switches, sensors, transmitters, etc.) configured to perform control functions such as opening or closing valves and measuring process parameters. RTUs enable this interface by communicating commands from the host to the field devices and by communicating data sent by the field devices back to the host. Such communications may be implemented via any of analog, digital, or combined analog/digital buses using any desired communication media (e.g., hardwired, wireless, etc.) and protocols (e.g., Fieldbus, Profibus®, HART®, etc.).

SUMMARY

Methods and apparatus to implement a remote terminal unit network are disclosed. An example method involves allocating, via a processor of a first remote terminal unit, a first time slot of a first frame of a first transmission schedule to the first remote terminal unit, the first remote terminal unit to be in communication with a second remote terminal unit in a network associated with a process control system and to be in communication with a host of the process control system, the first remote terminal unit to communicate first data over the network during the first time slot, and allocating, via the processor, a second time slot of the first frame to the second remote terminal unit, the second remote terminal unit to communicate second data over the network during the second time slot.

An example apparatus comprises a processor of a first remote terminal unit. The first remote terminal unit is to be in communication with a second remote terminal unit in a network associated with a process control system. The first remote terminal unit is also to be in communication with a host of the process control system. The processor is to execute a network interface to enable communications over the network and to execute a network configuration application. The network configuration application is to generate a transmission schedule allocating first and second time slots of a first frame of the transmission schedule for the respective first and second remote terminal units. The first remote terminal unit is to communicate first data over the network during the first time slot, and the second remote terminal unit is to communicate second data over the network during the second time slot.

Another example apparatus comprises a first remote terminal unit to be included in a network of remote terminal units, the first remote terminal unit including a processor and a transmitter, the processor to execute a transmission schedule according to which the first remote terminal unit is to be allocated two of a plurality of time slots within a given period of time to wirelessly communicate first data and second data, respectively, the first data to be communicated to a second remote terminal unit, the second remote terminal unit to be wirelessly communicatively coupled to a host.

An example tangible computer readable storage medium comprising instructions that, when executed, cause a machine to at least, according to a transmission schedule in which each of a plurality of remote terminal units in a network are to be allocated two of a plurality of time slots within a given period of time, wirelessly communicate first data during a first one of the plurality of time slots to one of the plurality of remote terminal units, the one of the plurality of remote terminal units wirelessly communicatively coupled to a host, and, according to the transmission schedule, wirelessly communicate second data during a second one of the plurality of time slots.

Another example tangible computer readable storage medium comprising instructions that, when executed, cause a machine to at least generate a visual representation of communication to be implemented via a wireless communication network, the wireless communication network to include a first remote terminal unit and a second remote terminal unit, the second remote terminal unit to be communicatively coupled to the first remote terminal unit and a process unit. The instructions further cause the machine to display the visual representation, and update the visual representation based on an input to be provided via one of a user or the first remote terminal unit, where the visual representation is to correspond to the communication to be implemented via the wireless communication network.

Another example tangible computer readable storage medium comprising instructions that, when executed, cause a machine to at least generate an interactive visual representation of a wireless communication network, the wireless communication network to include a first remote terminal unit and a second remote terminal unit, the second remote terminal unit to be communicatively coupled to the first remote terminal unit and a process control device. The instructions further cause the machine to display the visual representation, update the visual representation based on an input provided via a user, and, based on the input, communicate a command to the first remote terminal unit to control communication within the wireless communication network.

DETAILED DESCRIPTION

Remote terminal units (RTUs) enable the communication of data between field devices and/or other components and a supervisory control and data acquisition (SCADA) system, a distributed control system (DCS), or any other control system. As used herein, a SCADA system, a DCS, or a process control system are used interchangeably to refer to any type of control system. In a process control system, an operator and/or other personnel may monitor and/or control various operating process units and/or other aspects of the control system via a central host. To enable an operator to monitor and/or control a control system in this manner involves the communication of data between the host and the process units and/or the other aspects of the control system.

As such, in accordance with the teachings disclosed herein, an example RTU network is described that enables an operator to communicate with any and/or all process units of a control system associated with RTUs in the network via a single RTU of the network. As described in greater detail below, the example RTU network may implement a time division multiple access (TDMA) scheme to control communications between each RTU within the network. In general, TDMA allows multiple nodes in a network to share a common channel (e.g., the same radio frequency) by dividing the channel into multiple time slots. Thus, in some example RTU networks, each RTU is allocated one or more time slots within one or more TDMA frames that make up a complete or overall transmission schedule governing all communications for the entire network.

Figure 1:
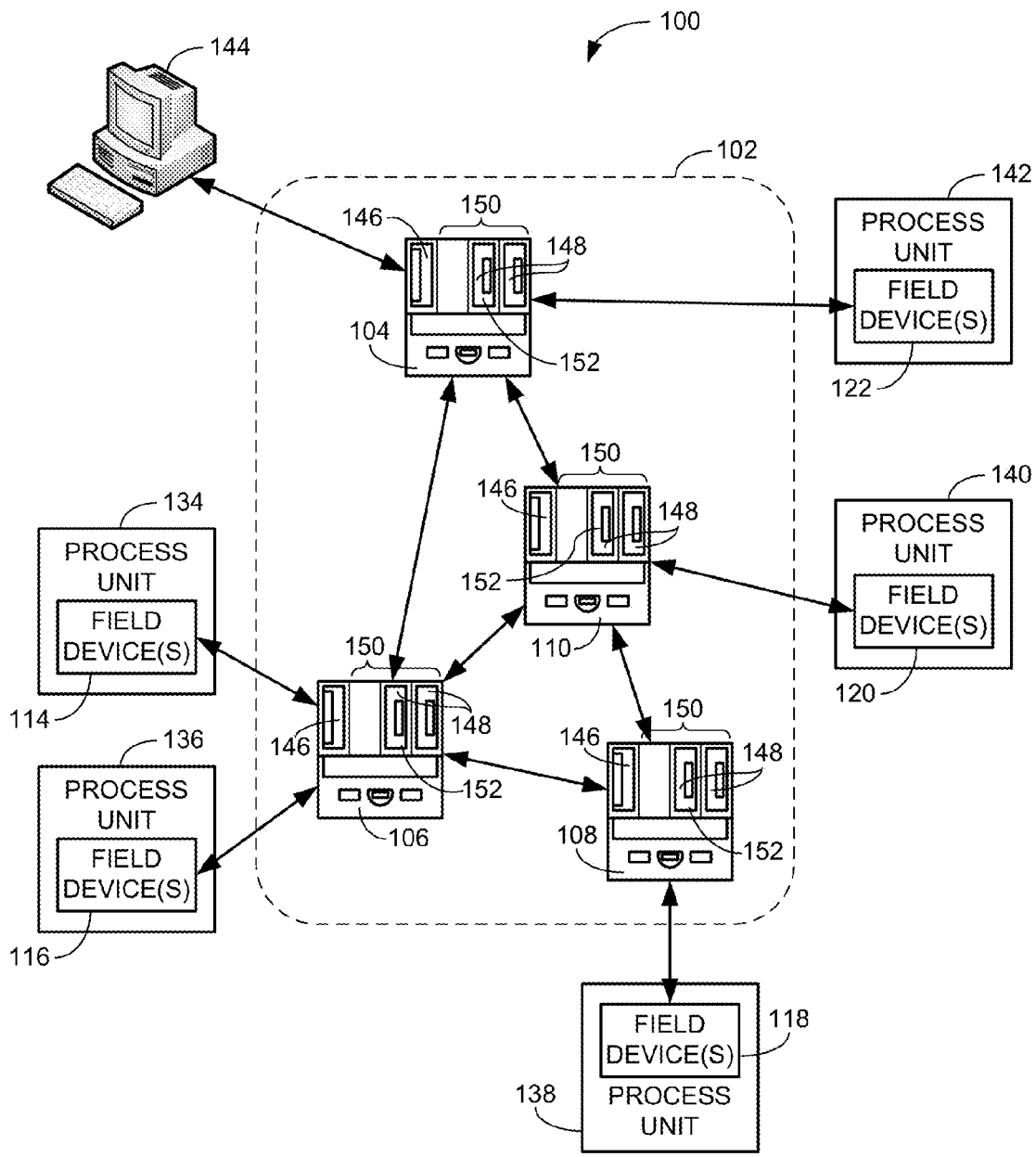
FIG. 1 illustrates a portion of an example control system within which the teachings of this disclosure may be implemented.

FIG. 1 illustrates a portion of an example control system 100 (e.g., a SCADA system) within which the teachings of this disclosure may be implemented. The example system 100 includes an RTU network 102 including a first RTU 104, a second RTU 106, a third RTU 108, and a fourth RTU 110. In some examples the network 102 is a wireless network. Each of the RTUs 104, 106, 108, 110 of the illustrated example are in communication with one or more field devices 114, 116, 118, 120, 122 within corresponding operating process units 134, 136, 138, 140, 142.

Additionally, as illustrated in FIG. 1, the first RTU 104 is also in communication with a host 144 associated with the example system 100. The first RTU 104, in communication with the host 144, functions as an access point through which a user may access and/or interact with the example network 102 and, thereby, access and/or interact with the example process units 134, 136, 138, 140, 142 via the corresponding RTUs 104, 106, 108, 110. For purposes of clarity, the first RTU 104 may be referred to herein as a primary RTU or as an access point because it communicates with the host 144 and manages the network 102 in accordance with the teachings disclosed herein. However, as will be described in greater detail below, any one of the RTUs 104, 106, 108, 110 may be designated as the primary RTU through which the host 144 may access the network 102.

In the illustrated example, communications between the various RTUs 104, 106, 108, 110 and/or the host 144 may be accomplished via any suitable communications device and/or medium. For example, each RTU 104, 106, 108, 110 may include and/or be coupled to a wireless radio. As used herein, the term radio refers to any of a wireless transmitter or a wireless receiver either separately or in combination. In some examples, as the primary RTU 104 is to manage the network 102, the primary RTU may communicate directly with each of the other RTUs 106, 108, 110. In other examples, any of the RTUs 106, 108, 110, may be separated by a distance greater than a range for the associated radio to communicate directly with the primary RTU 104. In such examples, the other RTUs 104, 106, 108 may communicate with one another to relay data to the primary RTU. Furthermore, even where the other RTUs 106, 108, 110 are in range, they still may communicate with one another independent of the primary RTU 104, thereby providing a robust network of interconnected nodes.

The example host 144 of FIG. 1 allows an operator, engineer, and/or other plant personnel (any of which may be referred to herein as a user) to review and/or interact with one or more operator display screens and/or applications that enable the user to view system variables, states, conditions, and/or alarms associated with the example control system 100; change control settings (e.g., set points, operating states, clear alarms, silence alarms, etc.) for the example control system 100; configure and/or calibrate devices within the example control system 100; perform diagnostics of devices within the example control system 100; and/or otherwise interact with devices within the example control system 100.

The example host 144 of FIG. 1 may be implemented using one or more workstations and/or any other suitable computer systems and/or processing systems. For example, the host 144 could be implemented using single processor personal computers, single or multi-processor workstations, a portable laptop computer, etc. The host 144 may be configured with one or more application stations to perform one or more information technology applications, user-interactive applications and/or communication applications. For example, an application station may be configured to perform primarily process control-related applications, while another application station may be configured to perform primarily communication applications that enable the control system 100 to communicate with other devices or systems using any desired communication media (e.g., wireless, hardwired, etc.) and protocols (e.g., HTTP, SOAP, etc).

Each of the RTUs 104, 106, 108, 110 comprises a central processing unit (CPU) 146 via which the functionality of each corresponding RTU 104, 106, 108, 110 is implemented. The CPU 146 of the first RTU 104 (i.e., the primary RTU) may be in communication with the host 144 of the example SCADA system 100 (e.g., via a wireless long haul radio). The CPU 146 of each RTU 104, 106, 108, 110 may also be in communication with the CPUs 146 of the other RTUs 104, 106, 108, 110 in the network 102. Additionally, in the illustrated example, each of the CPUs 146 is in communication with one or more ports or slots 150 of the corresponding RTU 104, 106, 108, 110 to interface with other components within the SCADA system 100 (e.g., the field devices 114, 116, 118, 120, 122) via one or more I/O cards or modules 148 inserted into ones of the slots 150. Furthermore, in the illustrated example, one of the I/O modules 148 in each RTU 104, 106, 108, 110 may be a network module 152 that enables communications between the RTUs 104, 106, 108, 110 over the network 102 independent of the CPUs 146. The network module 152 is described in greater detail below in connection with FIG. 2

As shown in the illustrated example, each RTU 104, 106, 108, 110 is communicatively coupled to one or more field device(s) 114, 116, 118, 120, 122 associated with corresponding process units 134, 136, 138, 140, 142. In some examples, at least some of the example field devices 114, 116, 118, 120, 122 may be smart field devices such as Fieldbus compliant valves, actuators, sensors, etc., in which case the smart field devices 114, 116, 118, 120, 122 communicate with the RTUs 104, 106, 108, 110 via one of the I/O modules 148 using the well-known Foundation Fieldbus protocol via any of wired or wireless communications media. Of course, other types of smart field devices and communication protocols could be used instead. For example, the smart field devices 114, 116, 118, 120, 122 could instead be Profibus® and/or HART® compliant devices that communicate with the RTUs 104, 106, 108, 110 using the well-known Profibus® and HART® communication protocols. Additionally or alternatively, in some examples, the field devices 114, 116, 118, 120, 122 may be communicatively coupled over a local wireless network in accordance with the WirelessHARTT™ protocol. In such examples, the corresponding RTU(s) 104, 106, 108, 110 may pass-through information and/or data from the host 144 to a WirelessHARTT™ interface module to communicate with the local wireless network of field devices. Further, in other examples, at least some of the field devices 114, 116, 118, 120, 122 may be non-smart field devices such as conventional 4-20 milliamp (mA) or 0-24 volts direct current (VDC) devices that communicate with the corresponding RTUs 104, 106, 108, 110 via respective hardwired links.

As shown in FIG. 1, some of the RTUs (e.g., the second RTU 106) may be in communication with multiple operating process units 134, 136, while the other RTUs (e.g., 104, 108, 110) are each in communication with a single process unit 138, 140, 142. As a result, the example system 100 may be configured for use in to a variety of circumstances. For example, each of the process units 134, 136, 138 may correspond to separate wellheads at an oil or gas production site, while the process units 140, 142 may correspond to a tank and a separator, respectively. In such an example, multiple wellheads may be associated with a single wellpad and monitored and/or controlled via a single RTU (e.g., the example RTU 106 with respect to the process units 134, 136). However, where a single wellhead is separated from others by a considerable distance, it may be desirable to provide a single RTU to service the remote wellhead (e.g., the example RTU 108 with respect to the process unit 138).

While FIG. 1 illustrates an example process control system 100 within which the RTU network 102, described in greater detail below, may be implemented, the methods and apparatus described herein may, if desired, be advantageously employed in other SCADA and/or process control systems of greater or less complexity (e.g., having more than one RTU network, having more RTUs in the network, having more operating process units, etc.) than the illustrated example of FIG. 1.

Figure 2:
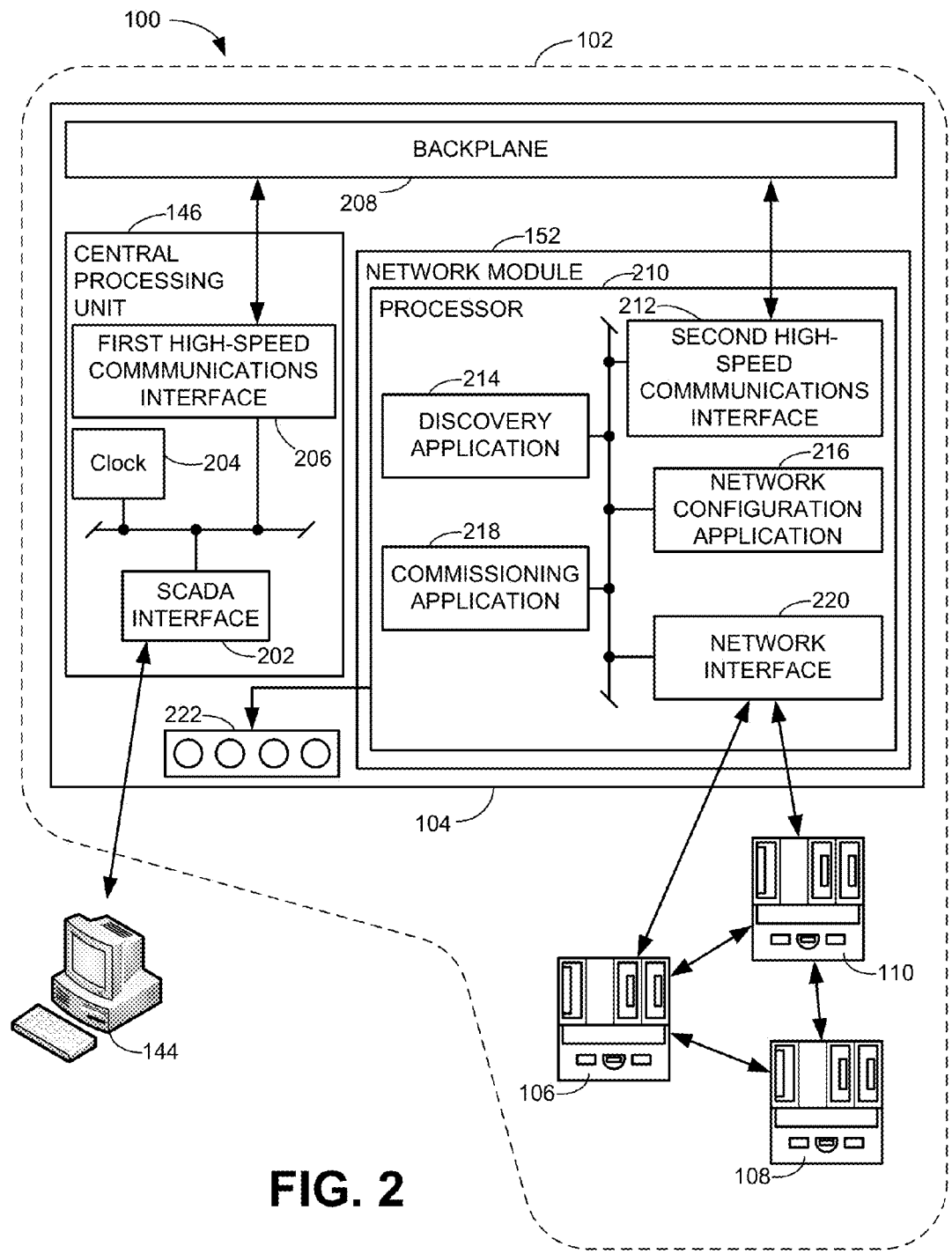
FIG. 2 illustrates an example manner of implementing the first example RTU, the example network, and/or, more generally, the example control system of FIG. 1.

FIG. 2 illustrates an example manner of implementing the first RTU 104 (e.g., the primary RTU), and/or, more generally, the example RTU network 102 of FIG. 1. As described above in connection with FIG. 1, the example primary RTU 104 of FIG. 2 includes the example CPU 146 and the example network module 152. The example primary RTU 104 may also include one or more other I/O modules 148 shown in FIG. 1 but omitted in FIG. 2 for clarity. In the illustrated example, the CPU 146 of the primary RTU 104 executes coded instructions associated with, among other things, an example SCADA interface 202, an example clock 204, and an example first high-speed communications interface 206. The example SCADA interface 202 may enable the first RTU 104 to interface with the example host 144 of the SCADA system 100 (e.g., via a wireless long haul radio). The example clock 204 provides the timing for all processing functionality of the CPU 146 and may be used to synchronize all the RTUs 104, 106, 108, 110 in the network 102 as described more fully below. The example first high-speed communications interface 206 provides functionality to send and receive data across a backplane 208 of the first RTU 104 to the example network module 152 and/or to any other I/O modules 148 inserted within the primary RTU 104. Although the illustrated example of FIG. 2 contains the backplane 208, other examples may contain a different type of high-speed communications interface and/or medium in place of the backplane 208 such as, for example, a Universal Serial Bus (USB) connection, an Ethernet connection, etc. In such examples, the first high-speed communications interface 206 may be adapted to interact with the corresponding high-speed communications interface and/or medium to be implemented. In some examples, the RTUs 104, 106, 108, 110 each include a global positioning system (GPS) receiver and/or other device(s) to determine a location of the respective RTUs 104, 106, 108, 110. In such examples, location data may be used to identify characteristics of the control system 100 in which the network 200 is being implemented. For example, the RTUs 104, 106, 108, 110 may be associated with various locations along a pipeline. By cascading location data for each RTU 104, 106, 108, 110 along the pipeline, in addition to the process parameters being measured, the location of anomalies (e.g., pressure variations and/or inferred leaks) may be determined.

The example network module 152 contains a processor 210 that may be any type of processing unit (e.g., a processor core, a processor, and/or a microcontroller) to execute coded instructions associated with, among other things, an example second high-speed communications interface 212, an example discovery application 214, an example network configuration application 216, an example commissioning application 218, and an example network interface 220. The example second high-speed communications interface 212 enables the communication of data between the network module 152 and the CPU 146 and/or other I/O modules in the RTU 104 via the backplane 208. As with the first high-speed communications interface 206, the example second high-speed communications interface 212 may interact with any other suitable high-speed communications interface and/or medium implemented in lieu of the backplane 208 such as, for example, a Universal Serial Bus (USB) connection, an Ethernet connection, etc. In some examples, the second high-speed communications interface 212 enables the communication of data between the network module 152 and the CPU 146 and/or other I/O modules in the RTU 104 via printed circuit board traces.

The example discovery application 214 illustrated in FIG. 2 enables the primary RTU 104 to automatically discover one or more unidentified RTUs (e.g., any of the example RTUs 106, 108, 110) connected to the network 102 to then be configured and/or commissioned. Current known methods of configuring a network of RTUs in a SCADA system typically involve individually entering the tag and/or identification data for each RTU to be configured, which may result in considerable time and cost. Such obstacles are overcome via the discovery application 214 of the illustrated example. In particular, when an RTU is first joined to a network, it has not been commissioned and, therefore, is in a "receive only" mode and may not be communicating (e.g., transmitting, sending, broadcasting, etc.) any data. As such, the primary RTU 104 has no way of recognizing or identifying the new RTU initially. However, in accordance with the teachings of this disclosure, the discovery application 214 may generate a message that is communicated over the network 102 requesting any unknown or unidentified RTU on the network to identify itself. RTUs that have already been identified (i.e., are already discovered) may be excluded from this discovery request by sending the identification data corresponding to each discovered RTU along with the request, thereby enabling each discovered RTU to determine whether it has been discovered already or whether it should respond to the discovery request. In the illustrated example, the discovery request may be communicated over the network 102 through the example network interface 220 via any suitable communications device associated with each of the RTUs 104, 106, 108, 110.

In some examples, when an undiscovered RTU receives a discovery request, it responds by communicating its corresponding identification data (e.g., tag, ID, etc.). However, as the undiscovered RTU has not been commissioned (not having even been discovered), the RTU has no instructions as to when the network is available to communicate the requested data. Accordingly, the undiscovered RTU may communicate its identification data during a randomly selected time slot within an overall transmission schedule associated with the network 102. Due to the random selection of time slots, there is a potential for collisions of transmissions. Collisions may occur when two or more undiscovered RTUs randomly select the same time slot to communicate their respective identification data or when at least one undiscovered RTU randomly selects a time slot that has already been allocated to another RTU (i.e., an RTU that has previously been discovered and commissioned) that is communicating data during that time slot. To overcome this problem, the discovery application 214 in the illustrated example may communicate the discovery request multiple times. As a result, while there may be some collisions, through repeated transmissions, the identification data of some undiscovered RTUs is received (e.g., via the network interface 220) and recognized by the discovery application 214. Once the identification data of an RTU is discovered, the discovery application 214 may store and/or communicate that data to the host 144 to inform a user that the RTU has been discovered. Additionally, the example discovery application 214 may include the identification data in the next communication (e.g., transmission, broadcast, etc.) of the discovery request to acknowledge discovery of the RTU such that the RTU no longer responds to any additional discovery requests. This process may be repeated until all RTUs are discovered.

While the primary RTU 104 has no information of how many RTUs are undiscovered, in some examples, the discovery application 214 of the primary RTU 104 may communicate discovery requests for a predetermined period of time sufficient to discover the maximum number of RTUs the network 102 can handle. For example, if the network 102 can include up to 24 RTUs, in addition to the primary RTU, the discovery time typically needed to discover all of the RTUs may be between 30 and 40 seconds. Thus, in such an example, the discovery application 214 may communicate discovery requests for a full minute before stopping to ensure all RTUs are discovered. In other examples, the discovery application 214 may communicate discovery requests until there has been a set period of time (e.g., 20 seconds) where no additional RTUs are discovered regardless of the total discovery time. Additionally or alternatively, while the discovery application 214 has no information about how many RTUs are to be discovered, the user may have such information. Accordingly, the discovery application 214 may include functionality that enables the user to stop communicating the discovery requests once the user recognizes that all RTUs have been found. This may be accomplished by the user providing an abort instruction and/or by the user pre-entering the number of RTUs to be discovered and enabling the discovery application 214 to continue to communicate discovery requests until the specified number of RTUs is discovered.

Once the example RTUs 106, 108, 110 have been discovered, they may then be configured and commissioned to function in the example network 102. In the illustrated example, communications over the network 102 may be implemented using time division multiple access (TDMA). Accordingly, each RTU 104, 106, 108, 110 may be allocated one or more time slots within one or more TDMA frames that define an overall transmission schedule for the network 102. In some examples, the network configuration application 216 of the primary RTU 104 may generate the overall transmission schedule for the network 102. Based on the overall transmission schedule, individual transmission schedules for each of the RTUs 104, 106, 108, 110 may be generated by the primary RTU 104 and/or a corresponding one of the other RTUs 106, 108, 110. The generation of example transmission schedules is described in greater detail below in connection with FIGS. 3-4b. In addition to configuring when (e.g., which time slots) each RTU 106, 108, 110 may communicate data over the network 102, in some examples, the network configuration application 216 also enables a user, via the host 144, to configure what data (e.g., parameter values, configuration data, diagnostic data, etc.) each RTU 106, 108, 110 is to communicate and to where on the network 102 the data is to be communicated (e.g., the address(es) of the intended recipient RTU(s)). Accordingly, the network configuration application 216 of the primary RTU 104 may generate instructions for each of the other RTUs 106, 108, 110 that define the configured content (e.g., type of data) and path(s) (e.g., destination address(es)) of communicated data to and/or from each corresponding RTU 106, 108, 110. Additionally or alternatively, the configuration application 216 may generate instructions for each of the RTUs 106, 108, 110 that defines when each RTU 106, 108, 110 is to receive data. Thus, rather than a source RTU (e.g., the RTU communicating data) including an address identifying the destination RTUs for particular data, the destination RTUs may be instructed to receive and/or process data received during the time slot of the transmission schedule allocated to the source RTU. In some examples, the instructions defining what data is communicated and where (or where from) the data is to be communicated may be incorporated in the overall transmission schedule and/or a corresponding individual transmission schedule. The configuration of the example network 102 by a user to enable the generation of instructions specific to each RTU 106, 108, 110 is described in greater detail below in connection with FIGS. 5-12.

The example commissioning application 218 of the network module 152 may commission the RTUs 106, 108, 110 by communicating the overall transmission schedule to each of the RTUs 106, 108, 110 indicating when each RTU 106, 108, 110 may communicate data over the network 102. Additionally or alternatively, the example commissioning application 218 may also provide the instructions associated with each RTU 106, 108, 110 indicating what data is to be communicated during the corresponding allocated time slots and to where the data is to be communicated. In the illustrated example, the overall transmission schedule, individual transmissions schedules and/or the specific instructions based on the network configurations may be communicated by the commissioning application 218 through the example network interface 220 via any suitable network communications device (e.g., a wireless radio) associated with the primary RTU 104.

While the foregoing discussion has described the network module 152 in the primary RTU 104, each of the other RTUs 106, 108, 110 in the illustrated example includes a separate network module 152 that may be substantially the same as the network module 152 described in connection with the primary RTU 104. Accordingly, in other examples, any of the other RTUs 106, 108, 110 may be configured by a user to manage the network 102 and to be the access point through which the host 144 communicates with the network 102. Thus, one difference between the primary RTU 104 and the other RTUs 106, 108, 110 of the illustrated example is that the other RTUs 106, 108, 110 use only a portion of the functionality of their corresponding network modules 152. For example, the RTUs 106, 108, 110 primarily communicate (e.g., transmit and/or receive) data over the network 102 through the corresponding network interface 220 via any suitable communication device (e.g., a wireless radio). More specifically, each RTU 106, 108, 110 of the illustrated example may communicate process variable data gathered from the corresponding process units 134, 136, 138, 140 shown in FIG. 1 and/or configuration data, diagnostic data, pass-through data and/or any other data requested via the primary RTU 104. Additionally, in the illustrated example, when each of the RTUs 106, 108, 110 is commissioned, the corresponding network configuration application 216 may write the overall transmission schedule, write and/or generate its individual transmission schedule based on the overall transmission schedule, and/or write and/or store the specific instructions to a corresponding memory to define when (e.g., allocated time slot(s)), what (e.g., type of data), and/or where the corresponding RTU 106, 108, 110 is to communicate over the network 102. Additionally or alternatively, each RTU 106, 108, 110 may write instructions to the corresponding memory to define when (e.g., designated time slot(s)) the respective RTUs 106, 108, 110 are to receive data (e.g., from one another). In some examples, the network configuration application 216 and the commissioning application 218 of each of the example RTUs 104, 106, 108, 110 may be executed concurrently and/or be combined into a single application.

Additionally, the example RTU 104 (and/or any of the other RTUs 106, 108, 110) of FIG. 2 may also have one or more example indicator lights 222 in communication with the network module 152. In some examples, the indicator lights 222 may be physically incorporated with the network module 152. In other examples, the indicator lights 222 may be incorporated into a housing or other enclosure of the RTUs 104, 106, 108, 110. The example indicator lights 222 may provide an indication of the status of the corresponding RTUs 104, 106, 108, 110 in the network 102 (e.g., whether the RTUs 104, 106, 108, 110 have been joined to the network 102 and/or whether they have been joined and commissioned). In some examples, the indicator light(s) 222 may indicate whether the corresponding RTU is designated as the access point in the network 102 or as a non-access point RTU, the signal strength (i.e., health), and/or the presence of communication (e.g., transmission and/or reception) activity. In some examples, a user may issue a command, via the primary RTU 104, for one of the other RTUs 106, 108, 110 to identify itself (e.g., by flashing the one or more indicator lights 222) to be observed by the user or other plant personnel physically located near the corresponding RTU 106, 108, 110. In this manner, where there are many RTUs in a network and on-site (e.g., physical) maintenance on a particular RTU is desired, a user may readily identify that RTU to reduce the time needed to locate that RTU.

One or more of the elements, processes and/or devices illustrated in the example first RTU 104 of FIG. 2 may be combined, divided, re-arranged, omitted, eliminated and/or implemented in any other way. Further, the example CPU 146, the example network module 152, the example processor 210, the example SCADA interface 202, the example clock 204, the example high-speed communication interfaces 206, 212, the example discovery application 214, the example network configuration application 216, the example commissioning application 218, the example network interface 220, the example indicator light(s) 222, and/or, more generally, the example RTU 104 of FIG. 2 may be implemented by hardware, software, firmware and/or any combination of hardware, software and/or firmware. Thus, for example, any of the example CPU 146, the example network module 152, the example processor 210, the example SCADA interface 202, the example clock 204, the example high-speed communication interfaces 206, 212, the example discovery application 214, the example network configuration application 216, the example commissioning application 218, the example network interface 220, the example indicator light(s) 222, and/or, more generally, the example RTU 104 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or method claims of this patent are read to cover a purely software and/or firmware implementation, at least one of the example the example CPU 146, the example network module 152, the example processor 210, the example SCADA interface 202, the example clock 204, the example high-speed communication interfaces 206, 212, the example discovery application 214, the example network configuration application 216, the example commissioning application 218, the example network interface 220, the example indicator light(s) 222, and/or, more generally, the example first RTU 104 are hereby expressly defined to include a tangible computer readable medium such as a memory, DVD, CD, Blu-ray, etc. storing the software and/or firmware. Further still, the example first RTU 104 of FIG. 2 may include one or more elements, processes and/or devices in addition to, or instead of, those illustrated in FIG. 2, and/or may include more than one of any or all of the illustrated elements, processes and devices.

Figure 3:
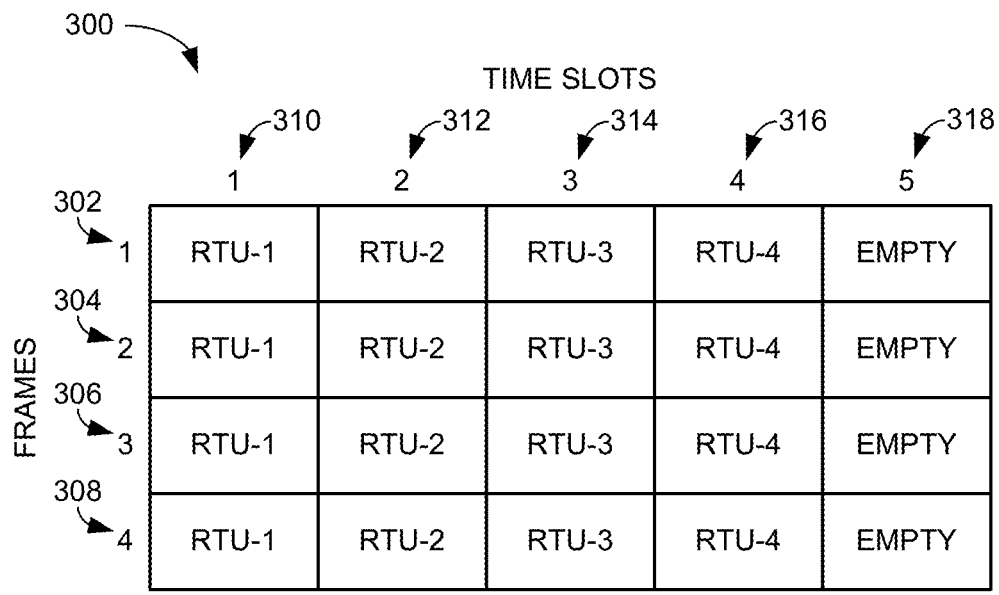
FIG. 3 represents an example transmission overall schedule in accordance with the teachings disclosed herein that may be employed by the example network of FIGS. 1 and 2.
Figure 4:
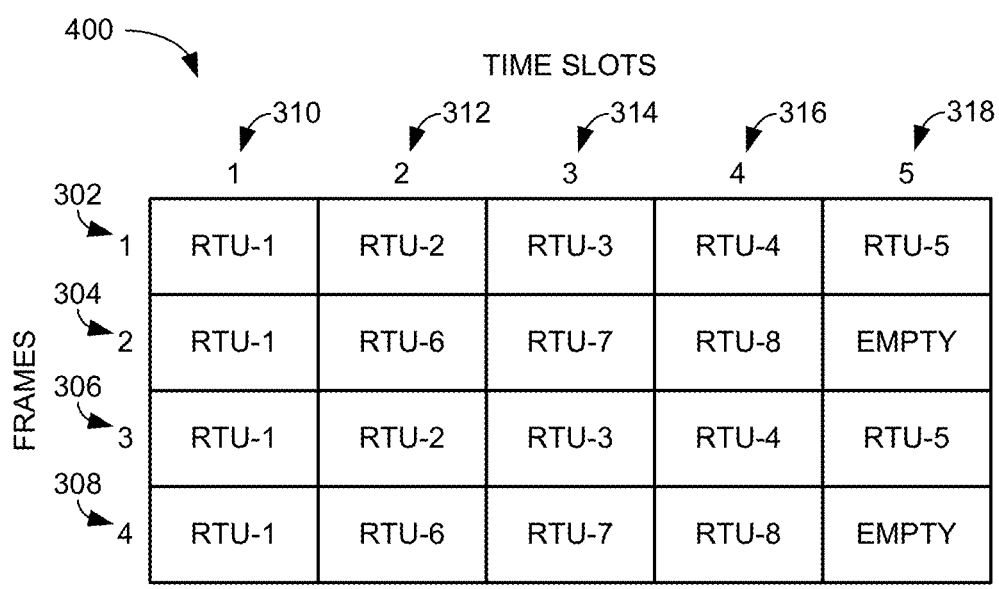
FIG. 4 represents another example overall transmission schedule in accordance with the teachings disclosed herein that may be employed by the example network of FIGS. 1 and 2.

FIGS. 3 and 4 represent example overall transmission schedules 300, 400 in accordance with the teachings disclosed herein that may be employed by the example network 102 of FIGS. 1 and 2. As described above, either of the example overall transmission schedules 300, 400 may be generated by the network configuration application 216 of the primary RTU 104 of the example network 102. In the illustrated example of FIG. 3, the example overall transmission schedule 300 comprises first, second, third, and fourth frames 302, 304, 306, 308 each having first, second, third, fourth, and fifth time slots 310, 312, 314, 316, 318. The example overall transmission schedule 300 defines when each RTU may communicate data over the network 102. Thus, in operation, the network 102 may implement the overall transmission schedule 300 beginning with the first time slot 310 of the first frame 302 through to the fifth time slot 318 of the fourth frame 302. Once the example network 102 of FIG. 1 cycles through the entire overall transmission schedule, the network 102 repeats the cycle. Thus, the total time period to cycle through the overall transmission schedule 300 and the total number of time slots 310, 312, 314, 316, 318 of each frame 302, 304, 306, 308 that are allocated to each RTU 104, 106, 108, 110 of the network 102 defines the rate at which each RTU 104, 106, 108, 110 may communicate data over the network 102. As described in greater detail below, the primary RTU 104 and/or the other RTUs 106, 108, 110 generate individual transmission schedules based on the overall transmission schedule 300, and each individual transmission schedule is implemented by a corresponding one of the RTUs 104, 106, 108 and 110 to implement the overall transmission schedule 300.

As the total bandwidth of the network 102 is constrained based on the communication technology employed and/or the particular application involved, in some examples, the frames 302, 304, 306, 308 may be configured to ensure the transmission of certain types of information and/or data. For example, it may be desirable to have some critical and/or deterministic data (e.g., process variable data) updated on a consistent and frequent basis. Accordingly, in some examples, some frames 302, 304 may be reserved for the transmission of periodic data (e.g., data that is communicated every time the overall transmission schedule passes the corresponding time slot). Reserving one or more timeslots in this manner may ensure that the primary RTU 104 and/or any of the other RTUs 106, 108, 110 of FIGS. 1 and 2 consistently receive updates for the process variables and/or other critical values at least once every cycle through the overall transmission schedule. In this manner, the host 144 of the SCADA system 100 of FIGS. 1 and 2 may poll the primary RTU 104 to obtain current data whenever needed for presentation to a user. The remaining frames 306, 308 may be allocated for all other data transmissions as the need arises (e.g., non-periodic). Such non-periodic data may include configuration data, diagnostic data, pass-through data, and/or any other data.

As shown in FIG. 3, the example overall transmission schedule 300 corresponds to a network of four RTUs represented by the labels RTU-1, RTU-2, RTU-3, and RTU-4. For purposes of this discussion, RTU-1 has been designated as the primary RTU (e.g., the example primary RTU 104 that is in direct communication with the host 144 in FIGS. 1 and 2). In some examples, the network configuration application 216 of the primary RTU (e.g., RTU-1) generates the overall transmission schedule 300 by first allocating the time slots 310, 312, 314, 316, 318 of the first frame 302. In such examples, the first time slot 310 of the first frame 302 may be allocated to RTU-1 (e.g., the primary RTU). In some examples, the order of allocating the subsequent time slots 312, 314, 316 may be based on the order in which each of the corresponding RTUs is discovered. In other examples, a user may designate the order of allocation when the RTUs are configured and commissioned. In the illustrated example, RTU-2 is allocated to the second time slot 312, RTU-3 is allocated to the third time slot 314, and RTU-4 is allocated to the fourth time slot 316. In the illustrated example of FIG. 3, there are no other RTUs, therefore, the fifth time slot 318 is not allocated to any RTU but remains empty (e.g., unallocated). Once the time slots 310, 312, 314, 316, 318 of the first frame 302 have been allocated, the network configuration application 216 may repeat the allocation of the time slots 310, 312, 314, 316, 318 of the second frame 304 and so on through the fourth frame 308 in the same manner. Accordingly, during one complete cycle of the example overall transmission schedule 300 of FIG. 3, each RTU is allocated four time slots (e.g., one in each of the four frames 302, 304, 306, 308) in which the corresponding RTU may communicate data over the network. Additionally, if the first two frames 302, 304 are reserved for periodic data (e.g., process variable data), the data may be communicated and/or updated twice (during two corresponding time slots) during each cycle of the example overall transmission schedule 300. Furthermore, in such an example, the two other frames 306, 308 provide two time slots for each RTU to communicate any other data over the network 102 during a single pass through the example overall transmission schedule 300.

In some examples, a user configuring the network 102 via the host 144 may manually allocate the empty time slot 318 of each frame 302, 304, 306, 308 to any one of the other RTUs to increase the bandwidth of the RTU allocated the additional time slot(s). In other examples, the empty time slot 318 of each frame 302, 304, 306, 308 may be allocated automatically by the network configuration application 216 of the primary RTU. In some such examples, the empty slot 318 of all frames 302, 304, 306, 308 may be allocated for a single RTU, thereby providing that RTU an additional transmission period during each frame 302, 304, 306, 308 of the overall transmission schedule 300. In other such examples, the empty slot 318 of each frame 302, 304, 306, 308 may be allocated for a different RTU such that each of the four RTUs is provided one additional transmission period during a complete cycle of the overall transmission schedule 300. In other examples, the empty time slots 318 may remain empty. In such examples, the primary RTU (e.g., the first RTU 104 of FIGS. 1 and 2) may instruct the other RTUs (e.g., the RTUs 106, 108, 110) to power down and/or enter a sleep mode during the empty time slots 318 to reduce the power consumption of the network (e.g., the network 102).

Based on the overall transmission schedule 300 for the example network 102, individual transmissions schedules, each of which is to be executed by a corresponding one of the RTUs 104, 106, 108, 110, are generated. Each of the example RTUs 104, 106, 108, 110 executes its corresponding one of the individual transmission schedules to enable the network 102 to execute the overall transmission schedule 300. In some examples, the primary RTU 104 generates the individual transmission schedules. For example, based on the overall transmission schedule 300, the primary RTU 104 generates individual transmission schedules, each of which corresponds to one of the RTUs 104, 106, 108, 110. The primary RTU 104 then communicates each one of the individual transmission schedules to the corresponding one of the RTUs 106, 108, 110. In other examples, each of the RTUs 104, 106, 108, 110 generates its respective individual transmission schedule.

In such examples, once the overall transmission schedule 300 is generated by the primary RTU 104, the primary RTU 104 communicates the overall transmission schedule 300 to the other RTUs 106, 108, 110 in the network 102. Then, each of the RTUs 104, 106, 108, 110 generates its respective individual transmission schedule based on the overall transmission schedule 300. In yet other examples, the host 144 generates one or more of the individual transmission schedules.

The example overall transmission schedule 400 of FIG. 4 has the same frames 302, 304, 306, 308 with the same time slots 310, 312, 314, 316, 318 as the example overall transmission schedule 300 of FIG. 3. However, the overall transmission schedule 400 is configured for a network (e.g., the example network 102) having eight RTUs represented by the labels RTU-1, RTU-2, RTU-3, RTU-4, RTU-5, RTU-6, RTU-7, and RTU-8. For purposes of this discussion, RTU-1 has been designated as the primary RTU (e.g., the example primary RTU 104 that is in direct communication with the host 144 in FIG. 1). In the illustrated example, the network configuration application 216 of the primary RTU generates the overall transmission schedule 400 by first allocating the time slots 310, 312, 314, 316, 318 of the first frame 302. In such an example, the first time slot 310 of the first frame 302 may be designated for the primary RTU (e.g., RTU-1). In some examples, the order of allocating the subsequent time slots 312, 314, 316, 318 may be accomplished via any suitable manner as described above. In the first frame of the illustrated example, RTU-2 is allocated the second time slot 312, RTU-3 is allocated the third time slot 314, RTU-4 is allocated the fourth time slot 316, and RTU-5 is allocated the fifth time slot 318.

Unlike the example overall transmission schedule 300 of FIG. 3, in the illustrated example of FIG. 4, there are three additional RTUs to be allocated time slots. Accordingly, in some examples, the network configuration application 216 may continue allocating time slots to the remaining RTUs in the next frame (e.g., the second frame 304). However, in some such examples, it may be desirable to allocate the first time slot 310 of the second frame 304 with the primary RTU (e.g., RTU-1). In this manner, the primary RTU, which manages all communications to and from the host 144, is allocated at least one time slot per frame. The remaining RTUs may then be allocated in the remaining time slots in accordance with the description above to generate the second frame 304 as shown in FIG. 3. Once the time slots 310, 312, 314, 316, 318 of the first and second frames 302, 304 have been allocated, the network configuration application 216 may repeat the allocation for the third and fourth frame 306, 308 in a similar manner. Accordingly, the example overall transmission schedule 400 allocates four time slots to RTU-1, two time slots to each of the other RTUs, and leaves empty the fifth time slot 318 in the second and fourth frames 304, 308. If the frames 302, 304, 306, 308 are divided into periodic (e.g., process variable data) and non-periodic data (e.g., configuration data, diagnostic data, pass-through data) communications as described above, each of the RTUs, other than RTU-1 (e.g., the primary RTU), is allocated one time slot for periodic data and one time slot for non-periodic data. Thus, in the illustrated example, each RTU may still communicate data for updating process variables at least once during a single cycle of the overall transmission schedule 400 while providing bandwidth (during the other corresponding time slot) for other data transmissions. As discussed above and described in greater detail below, individual transmission schedules scheduled are generated based on the overall transmission schedule 400 to enable the network 102 to execute the example overall transmission schedule 400.

Figure 5:
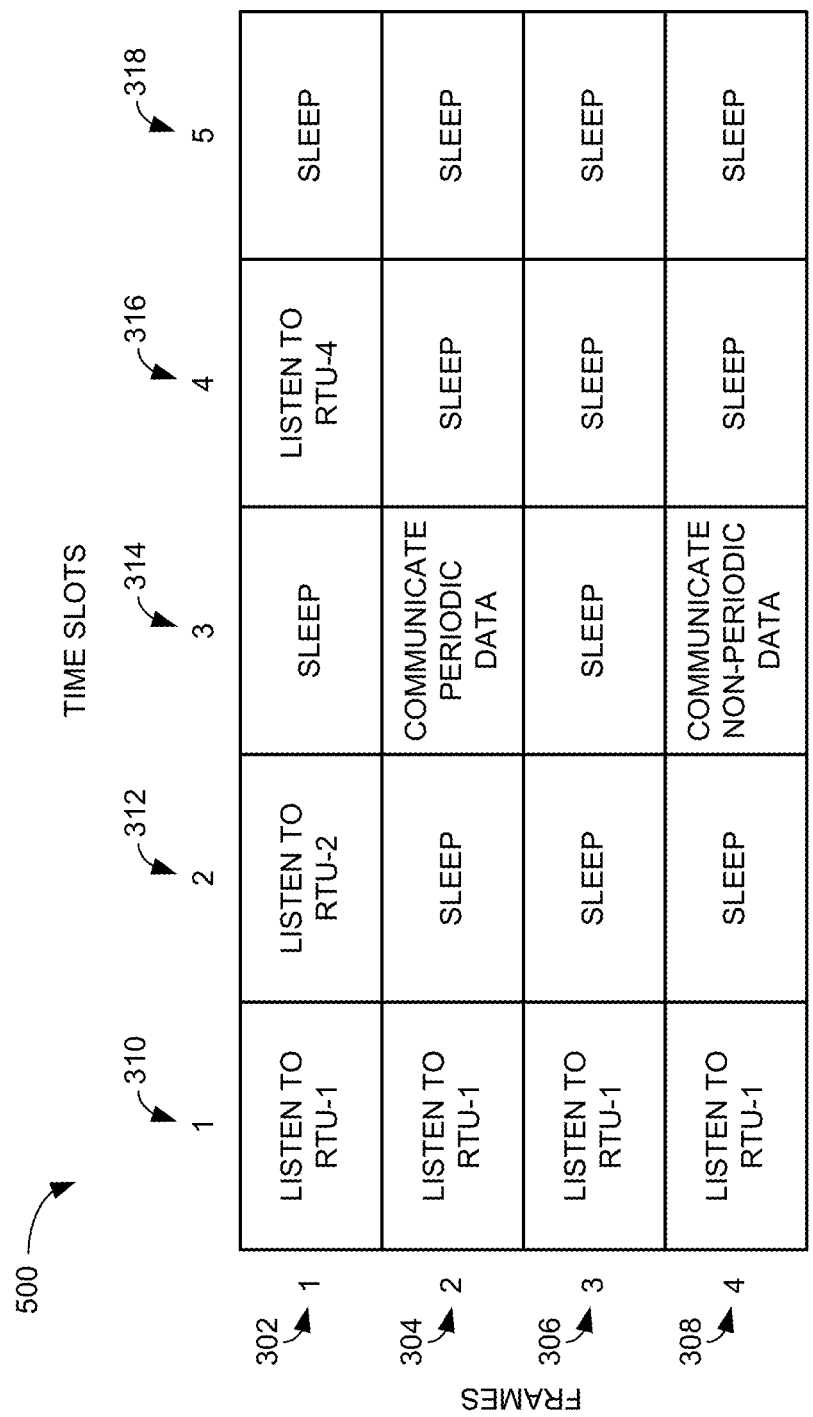
FIG. 5 represents the example individual transmission schedule of FIG. 4 from a functional perspective of a non-primary RTU.

FIG. 5 illustrates an example individual transmission schedule 500, which may be executed by RTU-7 to implement a portion of the example overall transmission schedule 400 of FIG. 4. Although not described separately below, each of the RTUs (e.g., RTU-1, RTU-2, etc.) in the network 102 executes a respective individual transmission schedule. Therefore, the individual transmission schedule 500 of FIG. 5 is merely an example and, thus, other individual transmission schedules may be generated and/or executed in other examples. Further, as discussed above, the example individual transmission schedule 500 may be generated by the host 144, the primary RTU (RTU-1) or by the RTU that is to execute the individual transmission schedule 500 (e.g., RTU-7). In some examples, the individual transmission schedule 500 is generated when RTU-7 is commissioned, when the configuration of the network 102 is changed (e.g., a command is communicated to an RTU to begin communicating data), and/or at another time and/or in response to other conditions.

In the illustrated example, the individual transmission schedule 500 includes the same time slots 310, 312, 314, 316, 318 and the same frames 302, 304, 306, 308 as the overall transmission schedule 400. Thus, because the example the third time slot 314 in the second and fourth frames 304, 308 in the example overall transmission schedule 400 of FIG. 4 are allocated to RTU-7 to communicate data, RTU-7 is also allocated the third time slot 314 in the second and fourth frames 304, 308 of the example individual transmission schedule to transmit data. In the illustrated example, the third time slot 314 in the second frame 304 is allocated for transmission of periodic data while the third time slot 314 in the fourth frame 308 is allocated for all other data transmissions (e.g., non-periodic data) as shown by the labels on the respective time slots 314. As described in greater detail below, the periodic data (e.g., fluid pressures, fluid temperatures, etc.) to be communicated by RTU-7 during the third time slot 314 in the second frame 304 may correspond to a visual representation (FIGS. 6-10) of the network 102 generated by the host 144.

In addition to defining when RTU-7 is to communicate data, the example individual transmission schedule 500 defines time slots during which RTU-7 is to receive data that is to be communicated over the network 102 by other RTUs based on the example overall transmission schedule 400. In the illustrated example, during the time slots in which RTU-7 is to receive data, RTU-7 is configured to listen for communications (e.g., receive and/or process the communications). In the illustrated example, RTU-7 is scheduled to receive data communicated via the primary RTU during the first slot 310 of each of the frames 302, 304, 306, 308. Because the primary RTU (e.g., RTU-1) and RTU-7 execute individual transmission schedules based on the same overall transmission schedule 400, the data communicated by the primary RTU during the allocated time slot 310 in each of the frames 302, 304, 306, 308 is properly received by RTU-7 (e.g., no collisions will occur).

Similarly, while RTU-2 is scheduled to communicate data during the first time slot 310 of the second frame frame 302 and RTU-4 is scheduled to communicate data during the fourth time slot 316 of the second frame 302 according to the overall transmission schedule 400, RTU-7 is scheduled to listen for communications from RTU-2 and RTU-4, respectively, according to the individual transmission schedule 500 of RTU-7. In this manner, any RTU in the example network 102 may communicate with any other RTU in the network 102 by configuring each RTU to transmit and/or listen for transmissions based on a single, overall transmission schedule. As described in greater detail below, the individual transmission schedules may correspond to a visual representation of the network 102 generated by the host 144.

In the illustrated example, during the time slots in which RTU-7 (or any other RTU) is not scheduled to communicate or receive data, RTU-7 may enter a sleep mode. As described above, this may correspond to the time slots that are not allocated to any RTU (e.g., the fifth time slot 318 in the second and fourth frames 304, 308 of the overall transmission schedule 400). However, the sleep mode may alternatively or additionally be implemented during time slots in which another RTU is communicating data that is not relevant to RTU-7 (e.g., RTU-7 is not configured to receive the data from the RTU communicated the data). Thus, in the example described, RTU-7 may enter the sleep mode during each time slot indicated by the label "SLEEP" in the example individual transmission schedule 500 of FIG. 5. In such an example, RTU-7 is in a sleep mode for twelve of the twenty time slots in the overall transmission schedule 400. In this manner, the power consumption of RTU-7 may be significantly reduced.

While FIGS. 3 and 4 have described example overall transmission schedules 300, 400 in connection with the network 102 having four and eight RTUs, respectively, an overall transmission schedule and individual transmission schedules may be configured in any suitable manner to satisfy the particular application(s) in which the teachings disclosed herein may be employed. Any particular network (e.g., the example network 102) may be subject to constraints and/or defined by several factors including the maximum throughput available for the network 102, the total number of RTUs in the network, the bandwidth to be provided to each RTU, and the desired time period in which the network 102 is to cycle through an entire overall transmission schedule. Within these bounds, an overall transmission schedule and individual transmission schedules may vary in a variety of ways including the number of frames, the number of time slots per frame, the allocation of the time slots, the division of the frames between periodic and non-periodic data, etc.

In one example, a guaranteed update period of one second for all process parameters in a control system associated with a network may be desired. Accordingly, the time period to cycle through an entire overall transmission schedule associated with the network may be set to one second (or less). Further, another configuration constraint of the example network may require each RTU to communicate up to 32 parameter values during a single time slot. In some example RTUs described herein, each parameter value may use 7 bytes of data, thereby requiring at least 224 (7×32) bytes per time slot (double precision values may require more data). Based on these example design constraints, a wireless network that communicates at a rate of 100 kbs may provide a maximum of 52 time slots. In such an example, to provide one periodic data frame having 26 time slots (to meet the one second update requirement) and one non-periodic data frame having 26 time slots (to provide time for other communications), the example network can include up to 25 RTUs in addition to a primary RTU that interfaces the network with a host system. However, it may be desirable to allocate more than two time slots to the primary RTU during the overall transmission schedule. In such a situation, the overall transmission schedule may be divided into four frames of 13 time slots, each with the first time slot of each frame being allocated to the primary RTU and the remaining 48 time slots being divided among 24 other RTUs. In yet another example, if each RTU requires greater bandwidth, the number of RTUs in the above example may be reduced to 12 RTUs, each of which is allocated one time slot in each of the four frames. In this last example, each RTU is allocated two time slots for periodic data and two time slots for non-periodic data.

Figure 6:
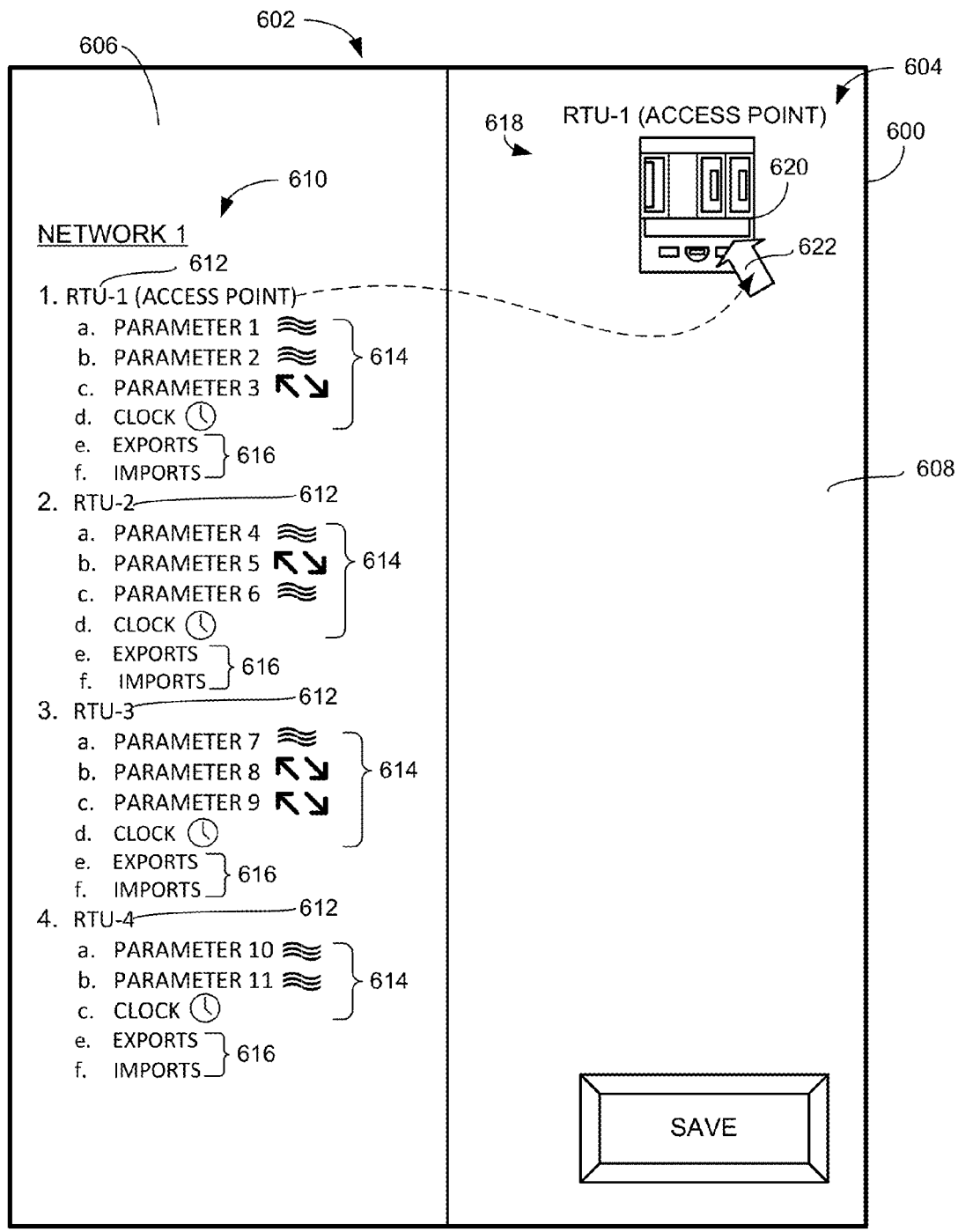
FIG. 6 illustrates an example visual representation of the example network of FIGS. 1 and 2.

FIG. 6 illustrates a first screen 600 of an example user-interface 602, which may be used to generate a first visual representation 604 of a communication network (i.e., the network configuration). Although the following examples are described in conjunction with the example host 144 and the example RTU network 102 of FIGS. 1-2, the example user-interface 602 may be used to visually represent and/or control other communication networks.

In some examples, the user-interface 602 is provided by the host 144 and displayed via, for example, a computer screen, a portable device (e.g., a laptop, a smart phone, a tablet, etc.), and/or any other display communicatively coupled to the host 144. In some examples, the host 144 utilizes a process control configuration application (e.g., ROCLINK™ 800 Configuration Software, etc.) to provide the user-interface 602. As described in greater detail below, the example user-interface 602 may be used to control communications within the RTU network 102.

In the illustrated example, during operation of the network 102, the primary RTU 104 communicates data to the host 144 such as for example, RTU ID data; process variable data; RTU status data, RTU configuration data; states and/or conditions of the control system 100; and/or any other data. In some examples, the data is communicated according to an individual transmission schedule of the primary RTU 104.

In some examples, based on the data communicated from the primary RTU 104 to the host 144, the host 144 generates the first visual representation 604 of the example RTU network 102 on the first screen 600. In other examples, the host 144 generates the first visual representation 604 prior to operation of the network 102 (e.g., prior to installation the RTUs 104, 106, 108, 110 in the control system 100, prior to commissioning the second RTU 106, the third RTU 108, and/or the fourth RTU 110, etc.) based on one or more inputs from a user, based on configuration data stored via the host 144, etc. In the illustrated example, the first screen 600 includes a first portion 606 and a second portion 608. In the illustrated example, the first visual representation 604 includes a list 610 (e.g., an expandable list) of the RTUs 104, 106, 108, 110 in the RTU network 102 and data related to each of the RTUs 104, 106, 108, 110 (e.g., time data, process variable data, etc.). The example list 610 of FIG. 6 is disposed in the first portion 606 of the first screen 600. In the illustrated example, the list 610 includes first items 612 (e.g., text, symbols, and/or any other suitable image) representative of the RTUs 104, 106, 108, 110 (e.g., "RTU-1," "RTU-2," "RTU-3," etc.) and second items 614 representative of data to be acquired via the respective RTUs 104, 106, 108, 110 such as, for example, parameter values (e.g., "PARAMETER 1," "PARAMETER 2", ETC.), time data (e.g., "CLOCK"), etc. The example list 610 may further include third items 616 representative of data to be communicated via the respective RTUs 104, 106, 108, 110 (e.g., "EXPORTS") and data to be received via the respective RTUs 104, 106, 108, 110 (e.g., "IMPORTS"). Other example lists include other items.

The example first visual representation 604 of FIG. 6 is user-interactive (i.e., the user-interface 602 enables a user to interact with the first visual representation 604) to enable a user to control and/or configure communication within the network 102. In the illustrated example, a schematic 618 of the RTU network 102 may be generated in the second portion 608 of the first screen 600. In the illustrated example, a first image 620 (e.g., a pictorial image, a symbol, etc.) representative of the primary RTU 104 is disposed in the second portion 608 of the first screen 600. In the illustrated example, the first image 620 is a simplified, cutaway view of an Emerson FloBoss™ 107 Flow Manager, which may be used to implement one of the example RTUs 104, 106, 108, 110 of the example network of FIGS. 1-2.

In the illustrated example, the host 144 generates the first image 620 in response to a user input provided via, for example, an input device (e.g., a keyboard, a mouse). For example, the user may drag-and-drop one of the first items 612 such as, for example, "RTU-1" from the first portion 606 of the first screen 600 to the second portion 608 of the first screen 600 (e.g., move a cursor 622 over "RTU-1" via the mouse, actuate a button of the mouse, move the cursor 622 via the mouse to the second portion 608 of the first screen 600, and release the button). The above-noted input is merely an example and, thus, any other suitable input may be used without departing from the scope of this disclosure. When the first item 612 is dragged-and-dropped onto the second portion 608 of the first screen, the host 144 updates the first visual representation 604 by generating the first image 620. The example first image 620 may be generated in any position on the second portion 608 of the first screen 600. Thus, the example user-interface 602 may be used to generate the schematic 618 of the RTU network 102 based on one or more inputs from a user.

Figure 7:
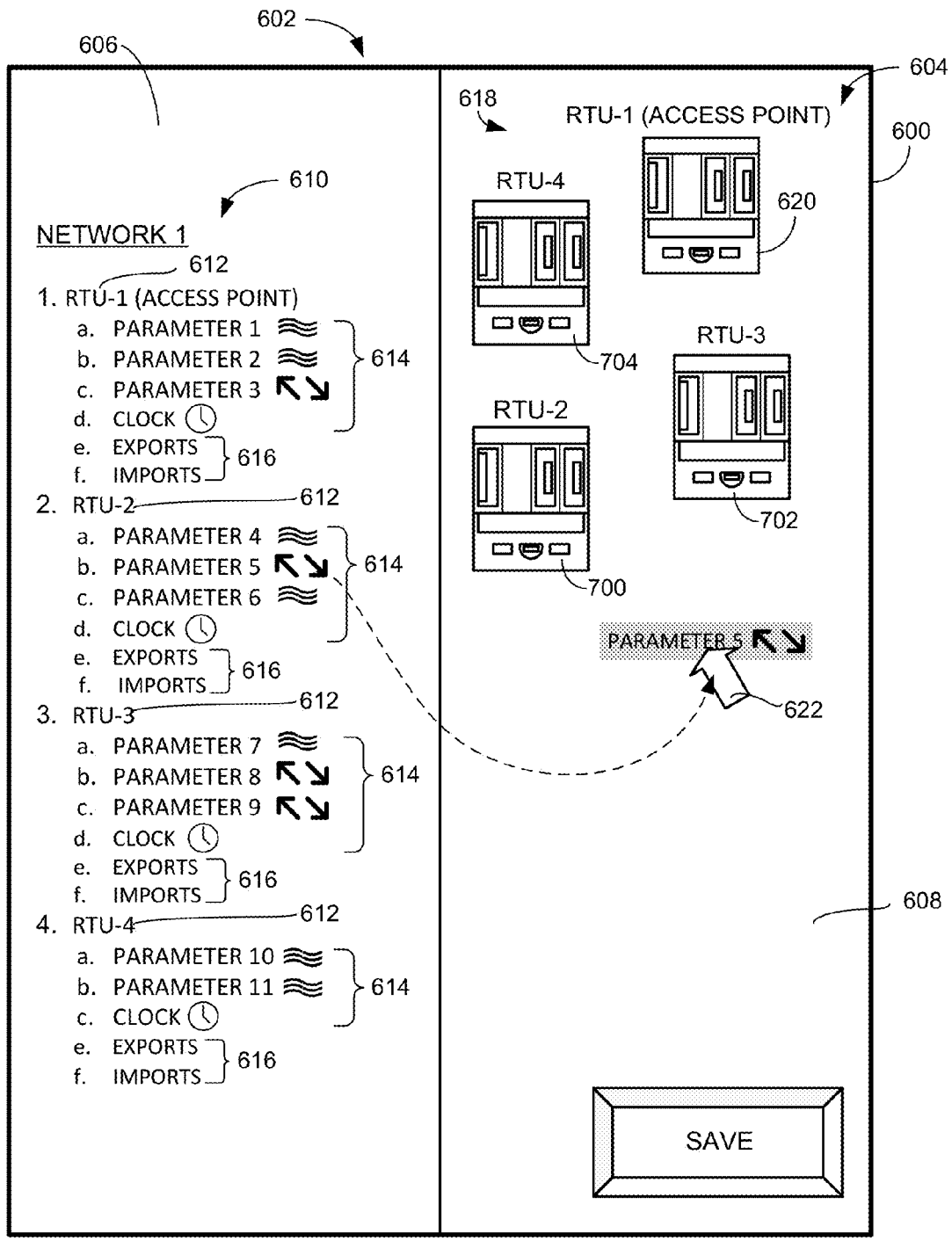
FIG. 7 illustrates the example visual representation of FIG. 6 updated to include images representative of the example RTUs in the example network of FIGS. 1 and 2.

FIG. 7 illustrates the first visual representation 604 of FIG. 6 updated based on user inputs such that the schematic 618 includes a second image 700 representative of the second RTU 106, a third image 702 representative of the third RTU 108 and a fourth image 704 representative of the fourth RTU 110. Thus, the example schematic 618 of FIG. 7 is representative of the RTU network 102. In the illustrated example, although the RTUs 104, 106, 108, 110 are commissioned and, thus, have been allocated time slots to communicate data according to an overall transmission schedule (e.g., the overall transmission schedule 300 of FIG. 3, the overall transmission schedule 400 of FIG. 4, etc.) and an individual transmission schedule (e.g., the example individual transmission schedule 500 of FIG. 5, etc.), the example first visual representation 604 of FIG. 7 does not indicate that any periodic data is being communicated within the RTU network 102. As described in greater detail below, by providing an input, a user may cause the host 144 to update the example first visual representation 604 to include a fifth image 800 (FIG. 8) representative of communication of periodic data between the example RTUs 104, 106, 108, 110 (i.e., communication within the RTU network 102).

Figure 8:
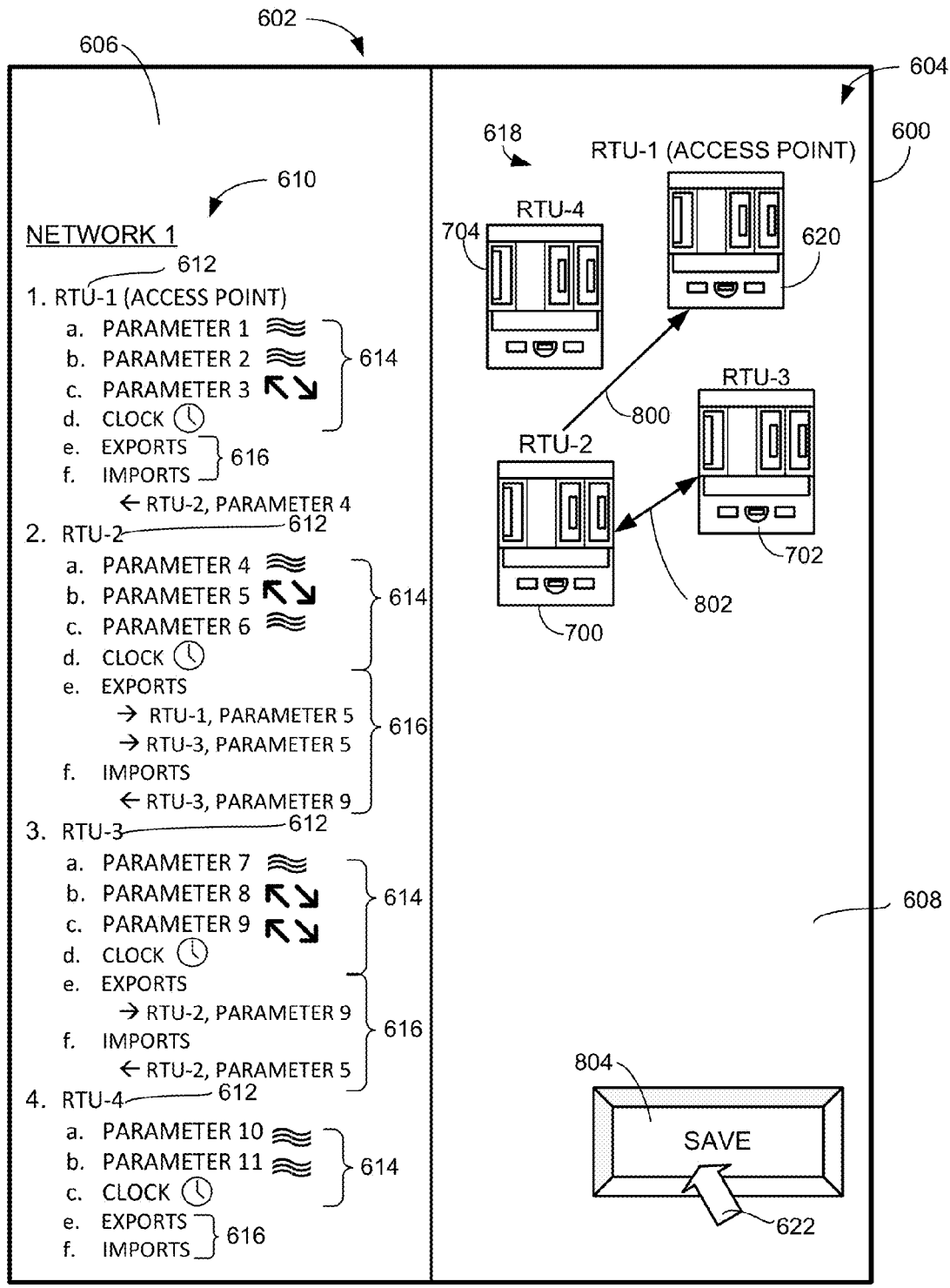
FIG. 8 illustrates the example visual representation of FIG. 7 updated to include images representative of communication within the example network of FIGS. 1 and 2.

FIG. 8 illustrates an update of the example first visual representation 604 of FIG. 7 in which the fifth image 800 and a sixth image 802 representative of communications within the RTU network 102 are displayed. In the illustrated example, the host 144 generates the fifth image 800 based on a user input in which one of the second items 614 representative of data to be acquired via the second RTU 106 such as, for example, "PARAMETER 5" is dragged-and-dropped from the first portion 606 of the first screen 600 onto the first image 620. In the illustrated example, the fifth image 800 is a first arrow pointing from the second image 700 to the first image 620, thereby representing communication of data (e.g., process variable data corresponding to "PARAMETER 5") from the second RTU 106 to the primary RTU 104 in the network 102.

The example sixth image 802 is a second arrow pointing from the second image 700 to the third image 702 and from the third image 702 to the second image 700 (i.e., the sixth image 802 is a double-headed arrow), thereby representing communication of data (e.g., process variable data) from the second RTU 106 to the third RTU 108 and communication of data from the third RTU 108 to the second RTU 106. In the illustrated example, the first visual representation 604 may be updated to include other images representative of communication of other data (e.g., a third arrow may be generated between the third image 702 and the fourth image 704 representing communication of data corresponding to "PARAMETER 10" from the third RTU 108 to the fourth RTU 110, etc.).

The example first visual representation 604 may include images representing all communications within the network 102 (e.g., communication corresponding to an overall transmission schedule of the network 102) or the visual representation may include images representative of communications implemented via one or several of the RTUs 104, 106, 108, 110 in the network 102 (e.g., communication corresponding to one or more individual transmission schedules). In some examples, if the user provides an input associated with one of the images representative of an RTU (e.g., by selecting one of the first items 612, the first image 620, the second image 700, the third image 702 or the fourth image 704), the host 144 updates the first visual representation 604 to show only the images representative of communications via the RTU. For example, if the user selects the first image 620, the host 144 updates the first visual representation 604 to highlight the first image 620, show the fourth image 704 and hide (e.g., not show) the fifth image 800.

In some examples, the first visual representation 604 is updated such that the list 610 corresponds to the schematic 618. For example, in response to one of the second items 614, (e.g., "PARAMETER 5") being dragged-and-dropped from the list 610 onto the first image 620, the host 144 generates an image (e.g., the fifth image 800) in the second portion 608 of the first screen 600 and includes another third item 616 (e.g., "RTU-1, PARAMETER 5") in the list 610 (e.g., under "EXPORTS" of "RTU-2") corresponding to the image.

The communication represented by the example first visual representation 604 of FIG. 8 may be implemented via the network 102. Thus, the example host 144 may be used to control and configure communication within the network 102 (i.e., the user, via the host 144, may configure the network 102 to enable the primary RTU 104 to generate instructions to determine what data is to be communicated by each of the RTUs 104, 106, 108, 110 and where the data is to be communicated (e.g., by the primary RTU 104 generating and communicating one or more new individual transmission schedules to the other RTUs 106, 108, 110, by the primary RTU 104 instructing one of the other RTUs 106, 108, 110 to generate a new individual transmission or update a stored individual transmission schedule, etc.). In some examples, the network configuration may be based on user input received via the host 144 prior to operation of the network 102 (e.g., prior to installation of the RTUs 104, 106, 108, 110 in the control system 100, prior to commissioning the second RTU 106, the third RTU 108, and/or the fourth RTU 110, etc.) and/or during operation of the network 102.

In the illustrated example, the first screen 600 includes a first button 804 labeled "SAVE." In some examples, when the user selects the first button 804 via the input device, the host 144 communicates a command to the primary RTU 104 to cause the communications implemented by the network 102 to correspond to the example first visual representation 604. For example, in FIG. 8, if the user selects the first button 804, the host 144 communicates one or more commands to the primary RTU 104 to command the second RTU 106 and the third RTU 108 to communicate data corresponding to the fifth image 800 and the sixth image 802 (e.g., by communicating respective new individual transmission schedules, by commanding the second RTU 106 and the third RTU 108 to generate new individual transmission scheduled or update their respective individual transmission schedules, etc.). As a result, the RTUs 106, 108 may begin communicating the data during one or more of the corresponding time slots of an overall transmission schedule as described above. In this manner, the communication implemented by the network 102 corresponds to the communication represented by the first visual representation 604 of FIG. 8. In some examples, the one or more commands to the primary RTU 104 are communicated when the first visual representation 604 is updated (e.g., to include and/or remove an image representative of one of the RTUs 104, 106, 108, 110 and/or communication within the network 102). Thus, the example host 144 may be used to control the communication within the network 102.

In some examples, when the user selects the first button 804, the host 144 stores data related to the first visual representation 604 (e.g., screen coordinates corresponding to a position of the first image 620, etc.). In some examples, the data related to the first visual representation 604 is communicated to the primary RTU 104. In some such examples, the primary RTU 104 communicates the data related to the first visual representation 604 (or portions thereof) to the second RTU 106, the third RTU 108, and/or the fourth RTU 110. In some examples, if the data is deleted from the host 144 and/or otherwise inaccessible, the host 144 may send a command to the primary RTU 104 requesting the data related to the first visual representation 604. In response, the primary RTU 104, the second RTU 106, the third RTU 108 and/or the fourth RTU 110 communicates the data to the host via the primary RTU 104. When the host 144 receives the data, the host 144 generates the first visual representation 604 based on the data.

Figure 9:
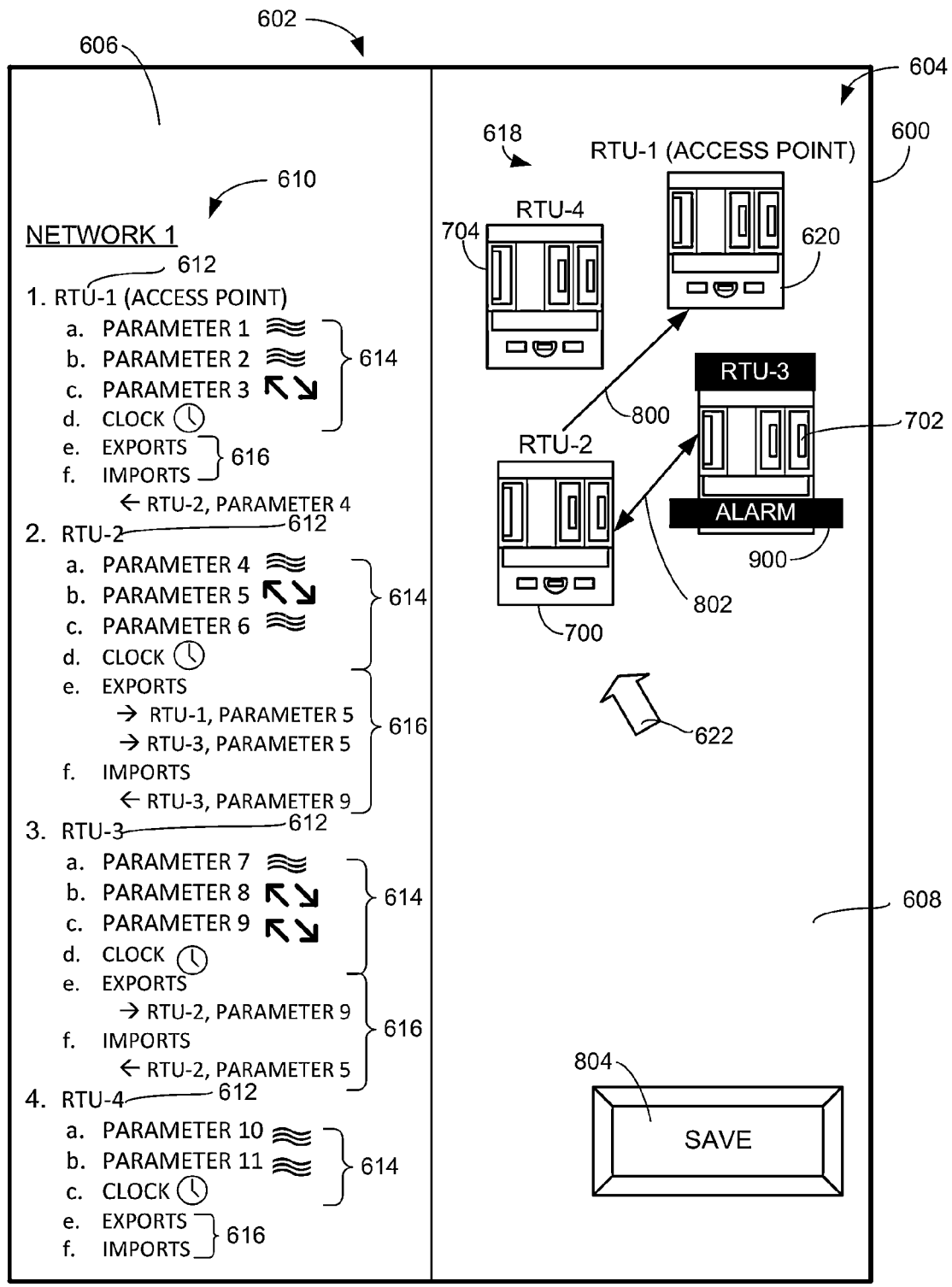
FIG. 9 illustrates the example visual representation of FIG. 8 updated based on an input provided via the first example RTU.

FIG. 9 illustrates the example visual representation of FIG. 8 updated based on an input provided via the primary RTU 104. In some examples, the host 144 updates the example first visual representation 604 based on communication of data (e.g., alarm data, configuration data, process variable data, status data, etc.) from the primary RTU 104 to the host 144. In the illustrated example, the primary RTU 104 communicates alarm data related to the third RTU 108 to the host 144. In response, the host 144 updates the first visual representation 604 by generating a first alarm image 900 representative of the alarm data. In other examples, the host 144 updates the first visual representation 604 (e.g., by generating other images) in response to other data communicated by the primary RTU 104 to the host 144. Thus, the example first visual representation 604 enables the user to monitor data communicated within the network 102 via the host 144. As described in greater detail below, the host 144 may generate instructions specific to each of the RTUs 104, 106, 108, 110 (e.g., instructions to perform an action such as, for example, provide a visual indication, synchronize time data, etc.) based on an input from the user.

Figure 10:
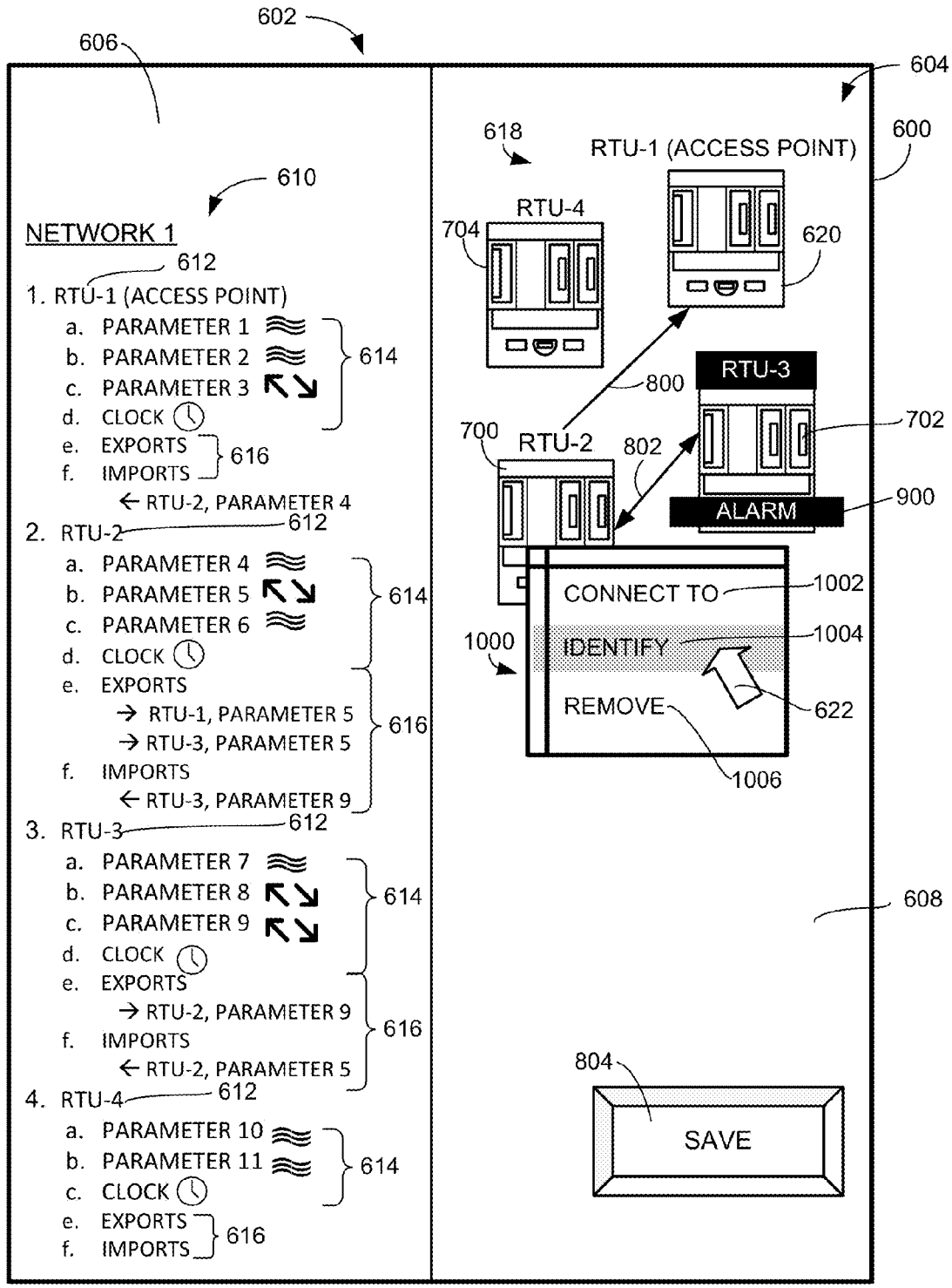
FIG. 10 illustrates the visual representation of FIG. 9 updated to include an example options menu.

FIG. 10 illustrates the example first visual representation 604 of FIG. 9 updated based on an input from the user associated with the second image 700. In some examples, the user-interface 602 enables the user to interact with the list 610 and/or the schematic 618 generated by the host 144. Although the following examples are described in conjunction with the second image 700, a user may interact with other images such as, for example, the first image 620, the third image 702, the fourth image 704, etc.

In the illustrated example, when the user provides an input associated with the second image 700 (e.g., by right-clicking the second image 700), the host 144 updates the first visual representation 604 to include an options menu 1000. In the illustrated example, the options menu 1000 includes a first option 1002, a second option 1004 and a third option 1006: "CONNECT TO," "IDENTIFY," and "REMOVE," respectively. Other examples include other options. In some examples, if the user provides an input associated with the options menu 1000 (e.g., by selecting one of the options 1002, 1004, 1006), the host 144 communicates a command to the primary RTU 104 to communicate instructions specific to the second RTU 106 (e.g., instructions to perform an action such as, for example, provide a visual indication, synchronize time data, etc.).

In the illustrated example, if the user selects the third option 1006 (i.e., "REMOVE"), the host 144 communicates a command to the network 102 via the primary RTU 104 to discontinue communication of data to and/or from the second RTU 106. In some examples, the host 144 updates the first visual representation 604 by removing the second image 700 and any images representative of the communication to and/or from the second RTU 106 (e.g., the fifth image 800, etc.).

In the illustrated example, if the user selects the second option 1004 (i.e., "IDENTIFY"), the host 144 communicates a command to the second RTU 106 via the primary RTU 104 to provide a visual indication (e.g., flash the indicator light(s) 222). In some examples, the visual indication indicates the status of the second RTU 106 in the network 102 (e.g., whether the second RTU 106 has been joined to the network 102 and/or whether the second RTU 106 has been joined and commissioned), whether the second RTU 106 is designated as the access point in the network 102 or as a non-access point RTU, the signal strength health, and/or the presence of transmission and/or reception activity. In some examples, the visual indication indicates an identity of the second RTU 106 (e.g., by flashing the one or more indicator lights 222) to the user or another plant personnel physically located near the second RTU 106.

In some examples, if the user selects the first option 1002 (i.e., "CONNECT TO") the host 144 communicates instructions to the second RTU 106 via the primary RTU 104 to communicate data (e.g., status data, diagnostic data, configuration data, alarm data, etc.) related to the second RTU 106 to the host 144. In response, the second RTU 106 communicates the data to the host 144 via the primary RTU 104. As described in greater detail below, in some examples, if the user selects the first option 1002, the user-interface 602 provides a second screen 1100 (FIG. 11).

Figure 11:
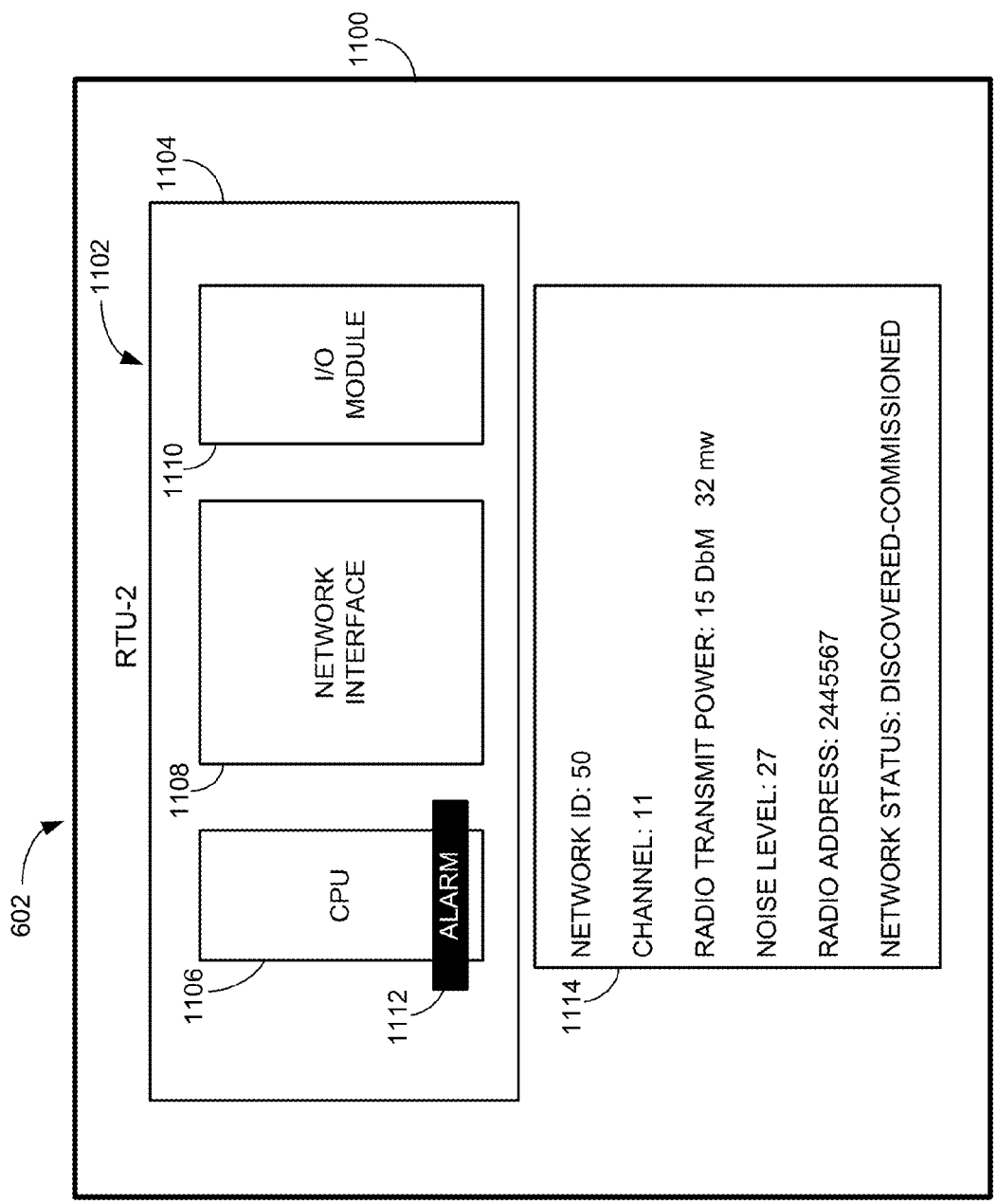
FIG. 11 is a visual representation of one of the example RTUs of the example network of FIGS. 1 and 2.

FIG. 11 illustrates the second screen 1102 of the example user-interface 602. In the illustrated example, based on the data communicated from the second RTU 106 to the host 144, the host 144 generates a second visual representation 1002 of the second RTU 106 on the second screen 1100. In the illustrated example, the second visual representation 1102 includes a seventh image 1104, an eighth image 1106, a ninth image 1108 and a tenth image 1110 representative of components of the second RTU 106 such as, for example, a housing, the CPU 146, the network module 152, and the I/O module 148, respectively. Other examples include images representative of other components.

In the illustrated example, the second RTU 106 communicates alarm data to the host 144 via the primary RTU 104. As a result, the host 144 generates a second alarm image 1112 representative of the alarm data. In the illustrated example, the second alarm image 1112 is disposed over the eighth image 1106 to indicate that the alarm data corresponds to the CPU 146 of the second RTU 106.

In some examples, in response to a command from the host 144, the second RTU 106 communicates configuration data, diagnostic data, and status data and/or other data to the host 144 via the primary RTU 104. As a result, the host 144 of the illustrated example generates a first table 1114 listing some or all of the data such as, for example, an ID of the network in which the second RTU 106 is communicatively coupled; a radio channel utilized by the second RTU 106; a radio transmission power; a noise level experienced by the second RTU 106; a radio address of the second RTU 106; and a network status of the second RTU 106 (e.g., discovered, commissioned, etc.). Other examples include other data. In some examples, some or all of the data is represented via symbols, marks, colors, etc. In some examples, the host 144 updates the second visual representation 1102 in response to receiving data from the second RTU 106, thereby enabling the user to monitor the data via the second screen 1100.

Figure 12:
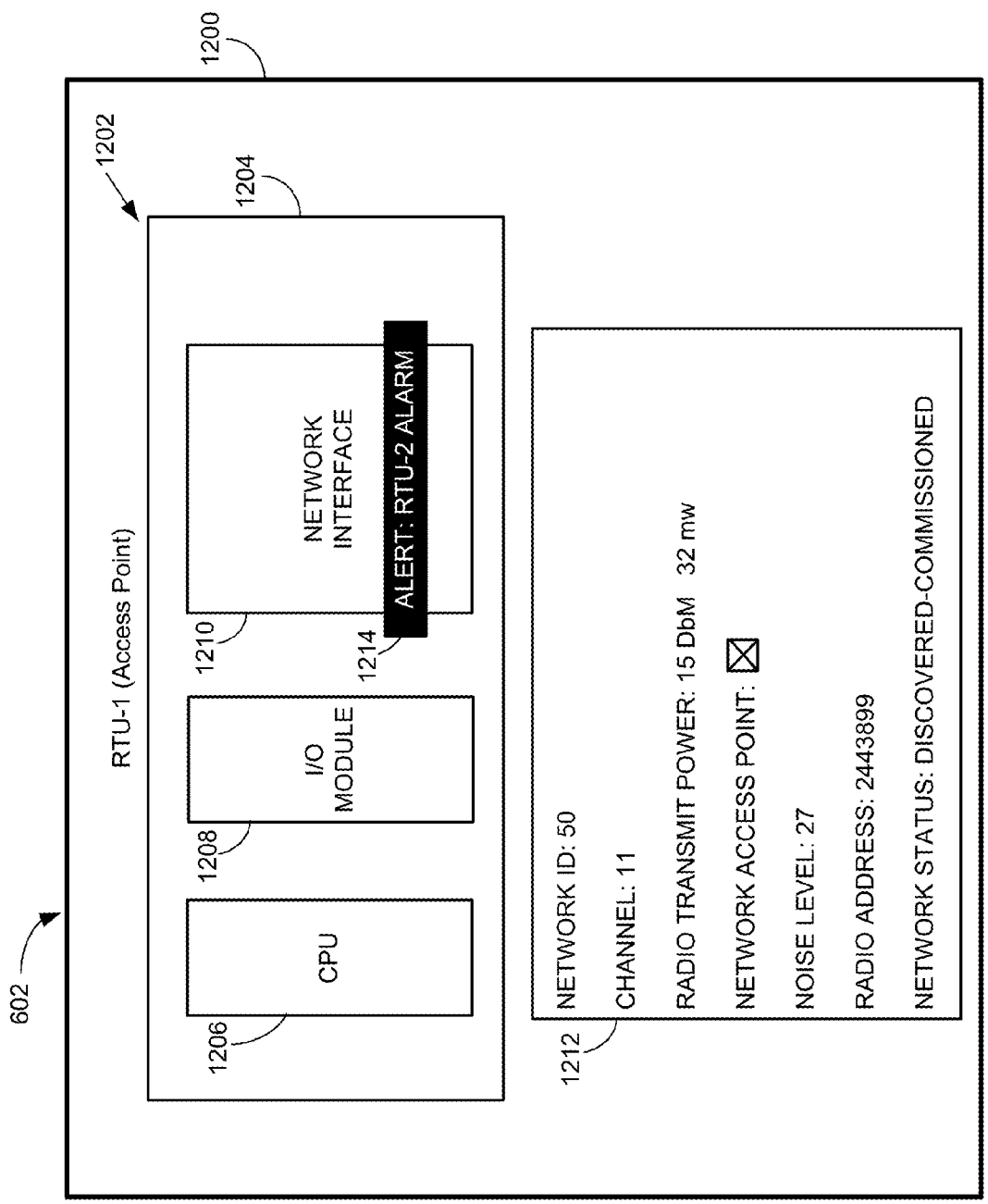
FIG. 12 is a visual representation of the first example RTU of the example network of FIGS. 1 and 2.

FIG. 12 illustrates an example third screen 1200 of the example user-interface 602. In some examples, if the user provides an input associated with the first image 620, the host 144 communicates a command to the primary RTU 104 to communicate data (e.g., status data, diagnostic data, configuration data, alarm data, etc.) related to the network 102 (e.g., data related to the primary RTU 104, the second RTU 106, the third RTU 108 and/or the fourth RTU 110) to the host 144. Based on the data received by the host 144, the host 144 provides the third screen 1200 and generates a third visual representation 1202 of the primary RTU 104.

In the illustrated example, the third visual representation 1202 includes an eleventh image 1204, a twelfth image 1206, a thirteenth image 1208, a fourteenth image 1210 and a second table 1212. The eleventh image 1204, the twelfth image 1206, the thirteenth image 1208 and the fourteenth image 1210 are representative of components of the example primary RTU 104 such as, for example, a housing, the CPU 146, the network module 152, and the I/O module 148, respectively. Other examples include images representative of other components.

In some examples, the primary RTU 104 communicates data related to the second RTU 106, the third RTU 108 and/or the fourth RTU 110 to the host 144. In some such examples, the host 144 generates the third visual representation 1202 of primary RTU 104 including one or more images representative of the data. In the illustrated example, the primary RTU 104 communicates alarm data related to the second RTU 106 to the host 144. As a result, the host 144 generates a third alarm image 1214 representative of the alarm data.

In some examples, in response to the command from the host 144, the primary RTU 104 communicates configuration data, diagnostic data, status data and/or other data related to the primary RTU 104 to the host 144. As a result, the host 144 generates the second table 1212 listing some or all of the data such as, for example, an ID of the network 102 in which the primary RTU 104 is communicatively coupled; a radio channel utilized by the primary RTU 104; an indication (e.g., a symbol, a label, etc.) that the primary RTU 104 is utilized as the access point to the network 102; a radio transmission power of the primary RTU 104; a noise level; a radio address of the primary RTU 104; and a network status of the primary RTU 104 (e.g., discovered, commissioned, etc.). Other examples include other data. In some examples, some or all of the data is represented via symbols, marks, colors, etc. In some examples, the host 144 updates the third visual representation 1202 in response to receiving data from the primary RTU 104, thereby enabling the user to monitor the data via the third screen 1200.

Figure 13:
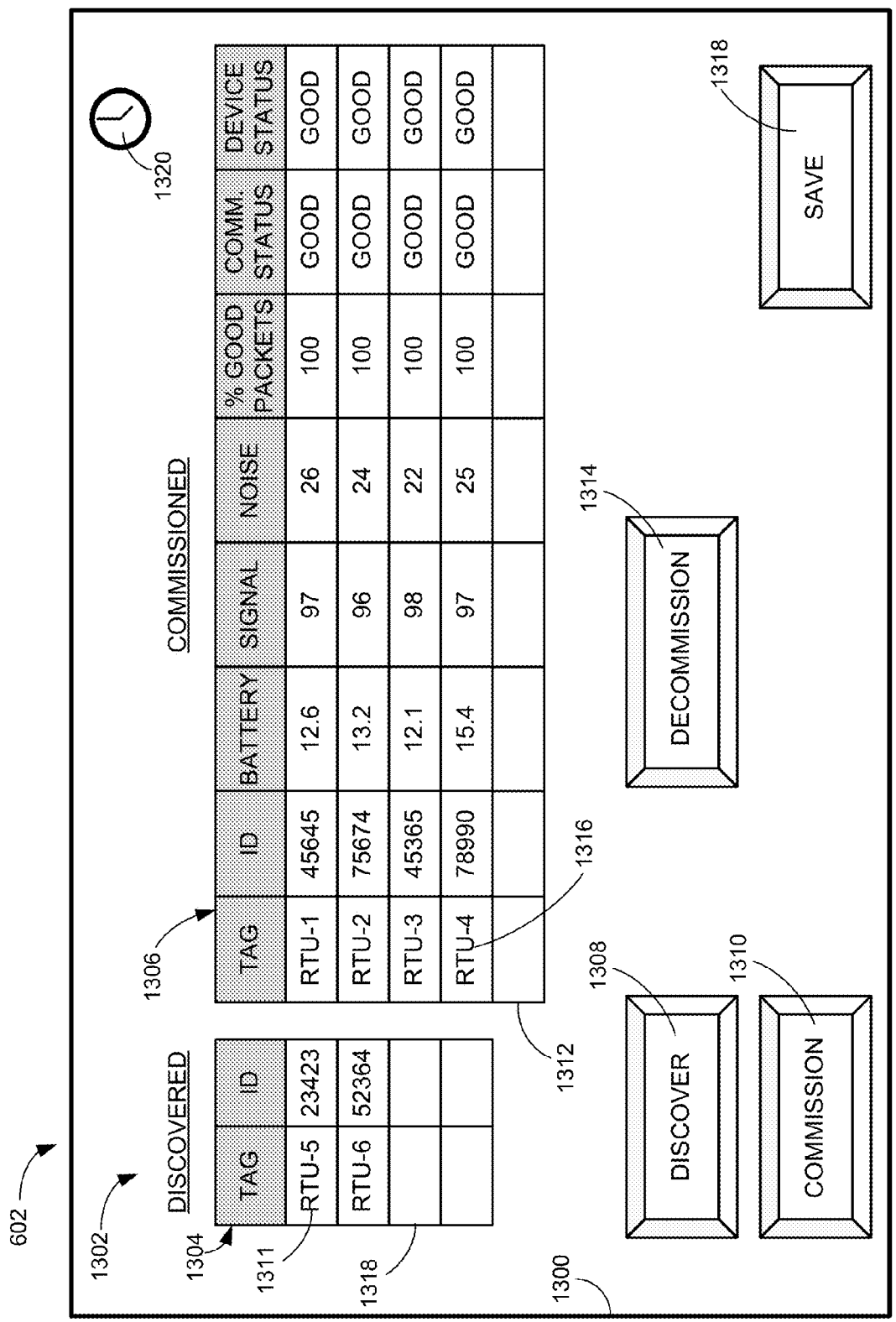
FIG. 13 is another visual representation of the example network of FIGS. 1 and 2.

FIG. 13 illustrates a fourth screen 1300 of the example user-interface 602 including a fourth visual representation 1302 of the example network 102. In some examples, based on the data communicated from the primary RTU 104 to the host 144, the host 144 generates the fourth visual representation 1302 of the network 102. In the illustrated example, the fourth visual representation 1302 includes a third table 1304 and a fourth table 1306. In the illustrated example, the third table 1304 lists discovered but non-commissioned RTUs (i.e., a fifth RTU and a sixth RTU). The example fourth table 1306 lists discovered and commissioned RTUs in the network 102 (i.e., the primary RTU 104, the second RTU 106, the third RTU 108 and the fourth RTU 110). In the illustrated example, the fourth table 1306 lists data (e.g., non-periodic data) related to the primary RTU 104, the second RTU 106, the third RTU 108 and the fourth RTU 110 such as, for example, diagnostic data, status data, etc. Other examples include other data. In some examples, based on the data communicated to the host 144, the host 144 updates the fourth visual representation 1302. For example, values of the data listed in the fourth table 1306 may change. In some examples, the host 144 generates an alert based on the data communicated and/or not communicated to the host 144. For example, if the host 144 does not receive status data related to one of the RTUs for a predetermined amount of time (e.g., 1 minute), the host 144 generates the alert.

In some examples, based on an input provided by a user, the host 144 updates the fourth visual representation 1302 and communicates a command to the primary RTU 104 to control communications within the network 102. In the illustrated example, based on an input provided by the user, the host 144 may communicate a command to the primary RTU 104 to, for example, discover unidentified RTUs, commission the discovered RTUs (i.e., the fifth RTU and the sixth RTU), and/or decommission one or more of the commissioned RTUs (i.e., the primary RTU 104, the second RTU 106, the third RTU 108 and/or the fourth RTU 110). For example, if the user selects a second button 1308 labeled "DISCOVER" on the fourth screen 1300, the host 144 communicates a command to the primary RTU 104 to discover unidentified RTUs as described in greater detail below. If any unidentified RTUs are discovered, the host 144 updates the fourth visual representation 1302 such that the third table 1304 lists the discovered RTUs.

In the illustrated example, if the user selects the third button 1310 labeled "COMMISSION," the host 144 communicates a command to the primary RTU 104 to commission the fifth RTU and/or the sixth RTU, and the host 144 updates the fourth visual representation 1302 such that the fourth table 1306 lists the commissioned RTUs. In some examples, if the user drags-and-drops an item 1311 (e.g., "RTU-5") from the third table 1304 onto an empty row 1312 of the fourth table 1306, the host 144 updates the fourth visual representation 1302 to include the item 1311 in the fourth table 1306 and communicates a command to the primary RTU 104 to commission an RTU corresponding to the item 1311 (e.g., the fifth RTU).

In the illustrated example, if the user selects a fourth button 1314 labeled "DECOMMISSION," the host 144 communicates a command to the primary RTU 104 to decommission one or more of the commissioned RTUs in the network 102, and the host 144 updates the fourth visual representation 1302 such that the third table 1304 lists the discovered but non-commissioned RTUs and the fourth table 1306 lists the commissioned RTUs. In some examples, if the user drags-and-drops an item 1316 (e.g., "RTU-4") from the fourth table 1306 onto an empty row 1318 of the third table 1304, the host 144 updates the fourth visual representation 1302 to include the item 1316 in the third table 1304 and communicates a command to the primary RTU 104 to decommission an RTU corresponding to the item 1316 (e.g., the fourth RTU 110).

In some examples, the user may provide an input to cause a non-commissioned RTU to supplant a commissioned RTU. For example, after installing the fifth RTU and uninstalling the fourth RTU 110 (e.g., after failure of the fourth RTU 110), the user may drag-and-drop the item 1311 (i.e., "RTU-5") listed in the third table 1304 onto the item 1316 (i.e., "RTU-4") listed in the fourth table 1306. In response, the host 144 updates the fourth visual representation 1302 to list "RTU-5" in the fourth table 1306 in place of "RTU-4." In some examples, if the user subsequently selects a fifth button 1318 labeled "SAVE," the host 144 communicates a command to the primary RTU 104 to decommission the fourth RTU 110 and commission the fifth RTU. In some examples, the host 144 further instructs the fifth RTU to communicate data according to the configuration of the fourth RTU 110. In some such examples, the data to be communicated via the fifth RTU is communicated during the same time slots of the overall transmission schedule of the network 102 previously allocated to the fourth RTU 110. For example, if the fourth RTU 110 is to communicate data corresponding to "PARAMETER 10" and the user selects the fifth button 1318, the host 144 communicates a command to the first RTU 104 to decommission the fourth RTU 110, commission the fifth RTU, and instruct the fifth RTU to communicate the data corresponding to "PARAMETER 10." If the fourth RTU 110 is to receive data corresponding to "PARAMETER 9" when the user selects the fifth button 1318, the host 144 communicates a command to the first RTU 104 to decommission the fourth RTU 110, commission the fifth RTU, and instruct the third RTU 108 to communicate the data corresponding to "PARAMETER 9" to the fifth RTU.

In some examples, time data utilized by the RTUs 104, 106, 108, 110 may be synchronized via the host 144 based on an input provided by a user. In the illustrated example, the fourth screen 1300 includes a clock button 1320. When the user provides an input associated with the clock button 1320 (e.g., by selecting the clock button 1320), the host 144 communicates time data to the network 102. In response, the first RTU 104 communicates the time data (e.g., a date and a time) and/or other data to the second RTU 106, the third RTU 108 and the fourth RTU 110. As a result, each of the RTUs 104, 106, 108, 110 utilizes the time data communicated by the host 144 and/or the first RTU 104 (e.g., the clock of each of the RTUs 104, 106, 108, 110 is set to the time and date). In some examples, if the user selects the second button 1308, the third button 1310, the fourth button 1314 or the fifth button 1318, the host 144 communicates time data to the network 102.

Flowcharts representative of example processes for implementing the example RTU 104, the example network 102, and/or, more generally, the example system 100 of FIGS. 1 and 2 are shown in FIGS. 14-18. In these examples, the processes may be implemented as one or more programs for execution by a processor such as the processor 210 shown in the example RTU 104 discussed above in connection with FIG. 2. The programs may be embodied in software stored on a tangible computer readable medium such as a CD-ROM, a floppy disk, a hard drive, a digital versatile disk (DVD), a Blu-ray disk, or a memory associated with the processor 210, but the entire programs and/or parts thereof could alternatively be executed by a device other than the processor 210 and/or be embodied in firmware or dedicated hardware. Further, although the example processes are described with reference to the flowcharts illustrated in FIGS. 14-18, many other methods of implementing the example RTU 104, the example network 102, and/or, more generally, the example system 100 may alternatively be used. For example, the order of execution of the blocks may be changed, and/or some of the blocks described may be changed, eliminated, or combined.

As mentioned above, the example processes of FIGS. 14-18 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which data is stored for any duration (e.g., for extended time periods, permanently, brief instances, for temporarily buffering, and/or for caching of the data). As used herein, the term tangible computer readable medium is expressly defined to include any type of computer readable storage and to exclude propagating signals. Additionally or alternatively, the example processes of FIGS. 14-18 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which data is stored for any duration (e.g., for extended time periods, permanently, brief instances, for temporarily buffering, and/or for caching of the data). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 14:
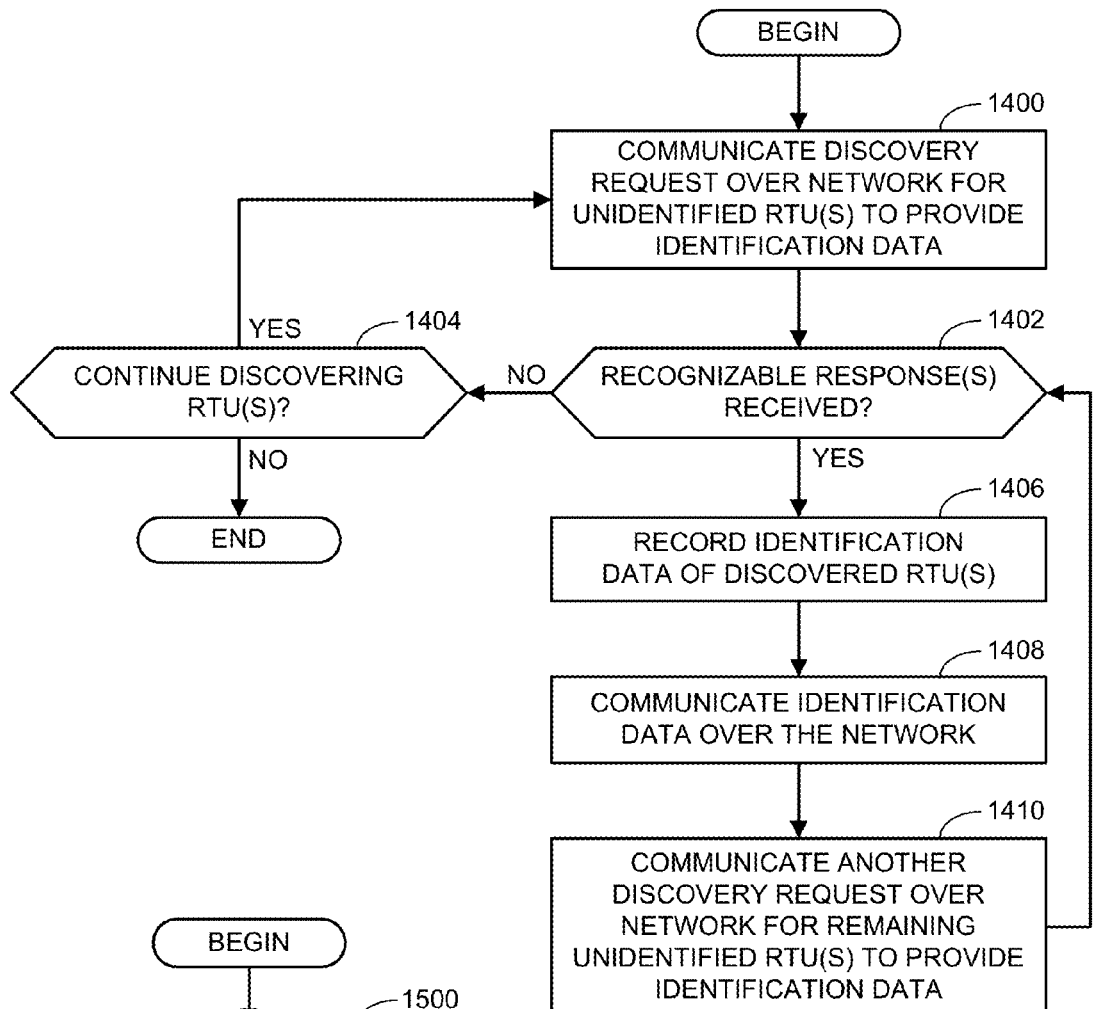
FIG. 14 is a flowchart representative of an example process that may be carried out to discover unidentified RTUs in a network.

FIG. 14 is a flowchart representative of an example process that may be carried out to discover unidentified RTUs in a network (e.g., the example network 102 of FIGS. 1 and 2). The example process includes communicating a discovery request over the network for one or more unidentified RTU(s) to provide corresponding identification data (block 1400). In some examples, the request may be generated and communicated over a network (e.g., 102) via a primary RTU (e.g., 104) in communication with a host (e.g., 144) of a SCADA system (e.g., the example system 100). In some examples the discovery request may be broadcast over the entire network (e.g., 102). However, in such examples, any RTUs that have already been discovered may not respond because the request may include the identification data of the discovered RTUs indicating such RTUs have already been identified.

The example process also includes determining whether one or more recognizable response(s) have been received (block 1402). As the discovery request is directed to undiscovered RTUs, when the RTUs respond, the responses will not be according to any scheduling scheme of the network (e.g., 102) but will occur randomly within the time slots of the overall transmission schedule of the network (e.g., 102). As a result, in at least some instances, the responses communicated by the one or more unidentified RTU(s) may collide and become unrecognizable. Additionally, the responses may collide with a scheduled message communicated by another RTU that has been discovered and allocated the time slot at issue. If every response results in a collision, no response will be recognizable (block 1402), in which case the example process determines whether to continue discovering the one or more unidentified RTU(s) (block 1404). If the example process is to continue discovering the unidentified RTU(s), control returns to block 1400 where another discovery request is communicated to the unidentified RTU(s) and the example process determines whether any recognizable response(s)

have been received (block 1402). A response may be recognizable when the response is communicated from an unidentified RTU during a randomly selected time slot in which no other RTU is communicating any data. In such a situation, the one or more RTU(s) that communicated the corresponding recognizable response(s) become newly discovered RTU(s), at which point the example process records the received identification data of the newly discovered RTU(s) (block 1406).

The example process further includes communicating (e.g., via the primary RTU 104) the identification data over the network (e.g., 102) (block 1408) and communicating (e.g., via the primary RTU 104) another discovery request over the network (e.g., 102) for the remaining unidentified RTU(s) to provide corresponding identification data (block 1410). In some examples, blocks 1408 and 1410 may be performed concurrently. The newly received identification data may be communicated over the network (block 1408) to enable the corresponding RTU(s) to determine whether their response to a previous discovery request was received indicating the RTU(s) have been discovered. In such an example, the newly discovered RTU(s) will no longer respond to the discovery request communicated at block 1410.

After communicating another discovery request (block 1410) control returns to block 1402 where the example process determines whether any recognizable response(s) have been received. If recognizable response(s) have been received, the blocks 1406, 1408, and 1410 are repeated. If no recognizable response was received, the example process returns to block 1404 to determine whether to continue to discover RTU(s). While the primary RTU (e.g., 104) issuing the discovery request has no information of whether or how many unidentified RTU(s) are on the network (e.g., 102) and, therefore, no information of when all unidentified RTUs have been discovered, the primary RTU (e.g., 104) may stop the discovery process if certain conditions arise, at which point the example process ends. In some examples, the process of FIG. 14 continues to discover RTU(s) (e.g., return to block 1400) for a predetermined period of time sufficient to discover the maximum possible number of unidentified RTUs on the network (e.g., 102). In other examples, the process may continue discovering RTU(s) until no recognizable responses have been received (block 1402) for a predetermined amount of time. Additionally or alternatively, the example process may determine whether to continue discovering RTU(s) based on user input. For example, a user may force a stop on the example process once the user recognizes all expected RTUs have been discovered. In another example, the user may enter the expected number of RTUs to be discovered and the example process ends after the entered number of RTUs has been discovered.

Figure 15:
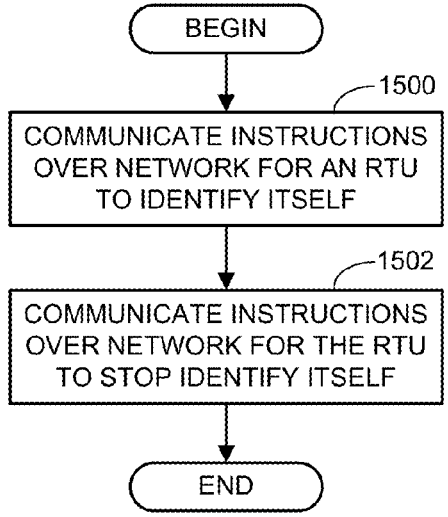
FIG. 15 is a flowchart representative of an example process that may be carried out to instruct an RTU to identify itself to a user physically located near the RTU.

FIG. 15 is a flowchart representative of an example process that may be carried out to instruct an RTU to identify itself to a user physically located near the RTU. The example process includes communicating (e.g., via the primary RTU 104) instructions over the network (e.g., 102) for an RTU to identify itself (block 1500). While the instructions may be communicated over the network (e.g., 102), the instructions include the address or other identifying data to indicate the instructions are intended for the particular RTU. Once received, the RTU may indicate its physical location by, for example, blinking or flashing one or more indicator lights (e.g., 222) coupled to the corresponding RTU. The example process may also include communicating (e.g., via the primary RTU 104) instructions over the network for the RTU to stop identifying itself (block 1502), at which point the example process ends. In some examples, block 1502 may be unnecessary as the instruction in block 1500 may include a time period after which the one or more indicator lights are to stop flashing. Additionally or alternatively, the RTU to which the instructions are sent may independently turn off the one or more indicator lights (e.g., 222) after some preset period of time.

Figure 16:
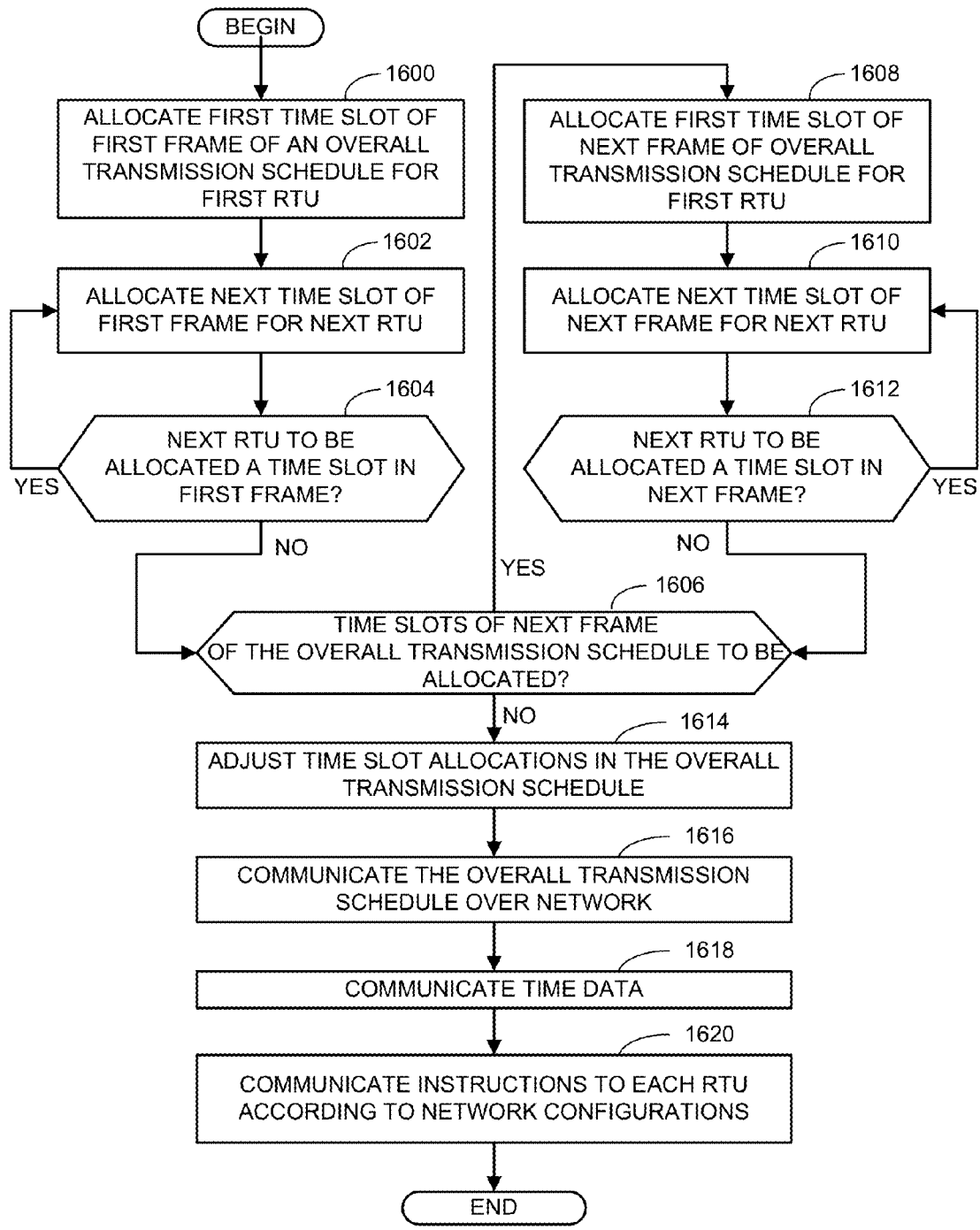
FIG. 16 is a flowchart representative of an example process that may be carried out to commission the example RTUs in the example network of FIGS. 1 and 2.

FIG. 16 is a flowchart representative of an example process that may be carried out to commission RTUs in a network (e.g., 102). The example process includes allocating a first time slot of a first frame of an overall transmission schedule for a first RTU (block 1600). In some examples, the first RTU corresponds to a primary RTU (e.g., 104) that manages the network and interfaces with a host (e.g., 144) of a SCADA system (e.g., 100). The example process further includes allocating a next time slot of the first frame for a next RTU (block 1602). The example process then determines whether a next RTU is to be allocated in the first frame (block 1604). If the example process determines that there the next RTU is to be allocated in the first frame (e.g., there is another RTU to be allocated and there is another time slot in the first frame available), the example process returns to block 1602 to allocate the next time slot of the first frame for the next RTU. This allocation of additional time slots of the first frame to additional RTUs continues until the example process determines (block 1604) that the next RTU is not to be allocated time slots in the first frame. Such a determination may arise when there are no additional RTUs to be allocated in the first frame and/or when there are no additional time slots available for allocation in the first frame.

If the next RTU is not to be allocated a time slot in the first frame (block 1604), the example process determines whether time slots of a next frame of the overall transmission schedule are to be allocated (block 1606). If it is determined that there is another frame to be allocated, the example process moves to blocks 1608, 1610, and 1612 to allocate the time slots of the next frame in a similar manner as discussed above in blocks 1600, 1602, and 1604. That is, the example process allocates a first time slot of the next frame of the overall transmission schedule for the first RTU (e.g., the primary RTU) (block 1608). Block 1608 ensures that the primary RTU (e.g., 104) is allocated a time slot in each frame to properly perform its function, regardless of whether the number of RTUs is greater or less than the total number of time slots per frame. Thus, after allocating the first time slot of the second frame for the first RTU (e.g., the primary RTU) (block 1608), the example process allocates the next time slot of the next frame for the next RTU (block 1610). The example process then determines whether a next RTU is to be allocated in the next frame (block 1612). If so, the example process returns to block 1610 and repeats itself until it determines that no additional RTUs are to be allocated to the next frame, at which point control returns to block 1606.

If the example process determines that no additional frames are to be allocated (i.e., every frame in the overall transmission schedule has been allocated) (block 1506), the example process may then adjust the time slot allocations of the overall transmission schedule (block 1614). Adjustments to the overall transmission schedule may be based on user input. For example, the generated overall transmission schedule may include one or more empty time slots that are not allocated to any RTU. Accordingly, a user may manually configure the one or more empty time slots to be allocated for one or more of the RTUs. In other examples, the adjustment may be made automatically via the primary RTU (e.g., 104).

With the overall transmission schedule generated, the example process communicates (e.g., via the primary RTU 104) the overall transmission schedule over the network to each RTU (block 1616). Thus, in the illustrated example, in response to receiving the overall transmission schedule, each RTU generates its respective individual transmission schedule based on the overall transmission schedule. In other examples, based on the overall transmission schedule, the primary RTU generates individual transmission schedules for the RTUs in the network and communicates one of the individual transmission schedules to a respective one of the RTUs. The example process communicates (e.g., via the primary RTU 104) time data (block 1618). In some examples, the time data may be based on a clock (e.g., 204) of the primary RTU (e.g., 104) and is communicated to all other RTUs in the network (e.g., 102) to enable all of the RTUs to be synchronized. In other examples, one or more of the RTUs may not be in direct communication with the primary RTU (e.g., 104) to receive the time data (e.g., wireless RTUs along a pipeline that are beyond the range of the radio associated with the primary RTU). In such examples, the time data may be obtained via a global positioning system (GPS) such that all RTUs in the network receive the same signal.

The example process of FIG. 16 also includes communicating (e.g., via the primary RTU 104) instructions to each RTU to communicate data to other RTUs according to network configurations (block 1620). The network configurations may define what data is to be communicated (e.g., specific parameter values from specific field devices) and where on the network the data is to be communicated (e.g., the primary RTU 104 and/or other RTUs). In some such examples, the instructions include a new or updated overall transmission schedule and/or a command to one or more of the RTUs to update its individual transmission schedule or generate a new individual transmission schedule. In other examples in which the primary RTU (e.g., RTU 104) generates individual transmission schedules, the instructions may include one or more new or updated individual transmission schedules. In some examples, configurations of the network (e.g., 102) may be based on user input received via the host when the network (e.g., 102) was first considered and/or during operation after configuration changes have been made to the network (e.g., 102). After block 1620, the example process of FIG. 16 ends.

Figure 17:
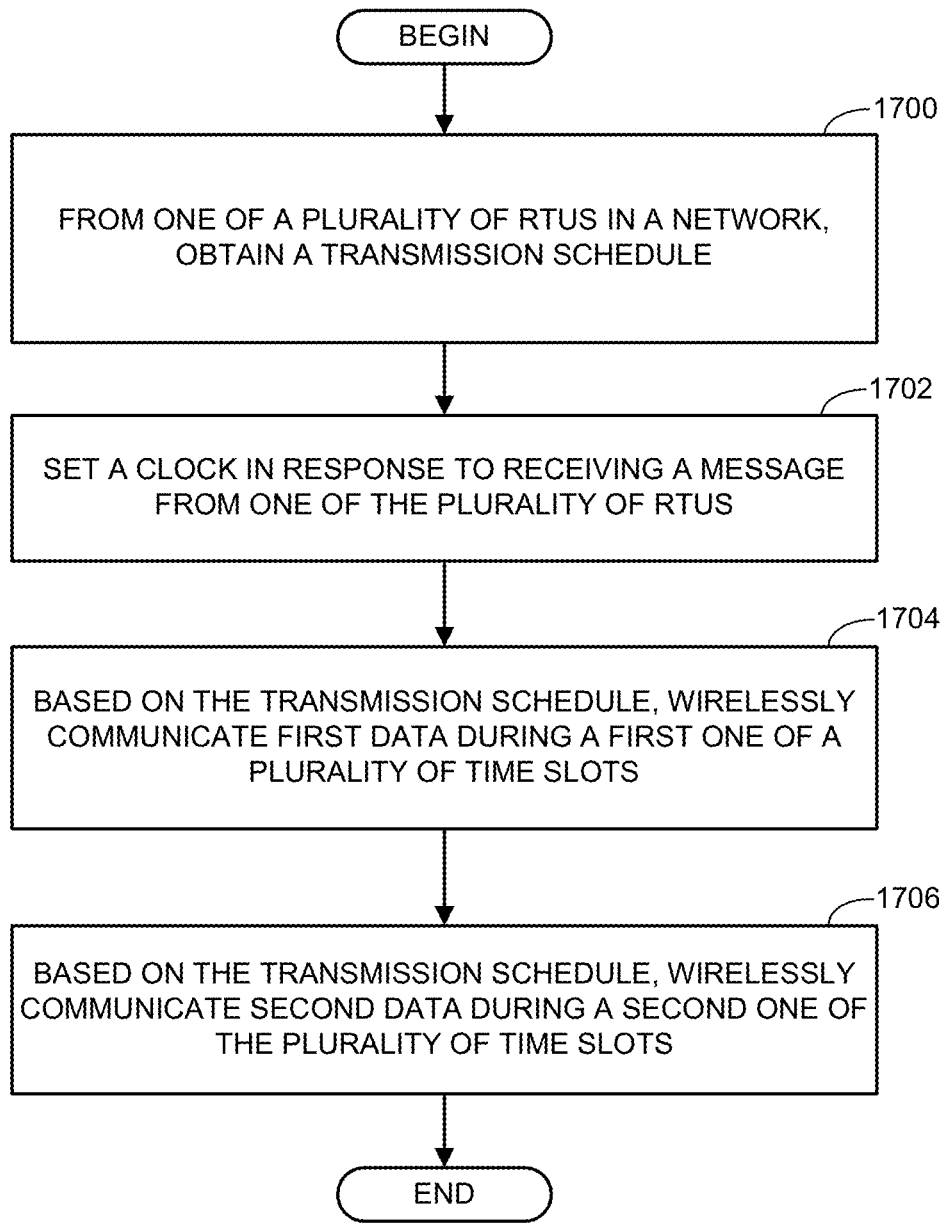
FIG. 17 is a flowchart representative of an example process that may be carried out to communicate data via one of the example RTUs in the example network of FIGS. 1 and 2.

FIG. 17 is a flowchart representative of an example process that may be used to communicate data via an RTU such as, for example, the second RTU 106. The example process begins by obtaining a transmission schedule (e.g., an overall transmission schedule or an individual transmission schedule) from one of a plurality of RTUs (e.g., the primary RTU 104) in a network (e.g., the network 102) (block 1700). A transmission schedule may be generated using the example process of FIG. 16. In some examples, an RTU receives an overall transmission schedule and generates an individual transmission schedule based on the overall transmission schedule. In other examples, an individual transmission schedule is received. In the illustrated example, each of the RTUs in the network is allocated two of a plurality of time slots within a given period of time (e.g., one second) to communicate data according to the transmission schedule. In some examples, each of the RTUs is allocated a different number of time slots (e.g., 1, 3, 4, etc.) At block 1702, the RTU sets a clock in response to receiving a message from one of the plurality of RTUs (e.g., the primary RTU 104). In some examples, time data is communicated (e.g., via the primary RTU 104) to each of the RTUs in the network to enable the RTUs to be synchronized based on the time data.

In some examples, instructions are communicated (e.g., from the host 144 via the primary RTU 104) to the RTU to communicate data to another RTU in the network. In some examples, the instructions include a new or updated overall and/or individual transmission schedule to be executed. In other examples, the instructions include a command to update a stored individual transmission schedule). At block 1704, based on the transmission schedule, the RTU wirelessly communicates first data (e.g., via a wireless radio) during a first one of the plurality of time slots. In some examples, the data includes parameter values obtained via a field device. At block 1706, according to the transmission schedule, the RTU wirelessly communicates second data during a second one of the plurality of time slots. Thus, the example process of FIG. 17 enables the RTU to communicate the first data and the second data within given period of time. After block 1706, the example process of FIG. 17 ends.

Figure 18:
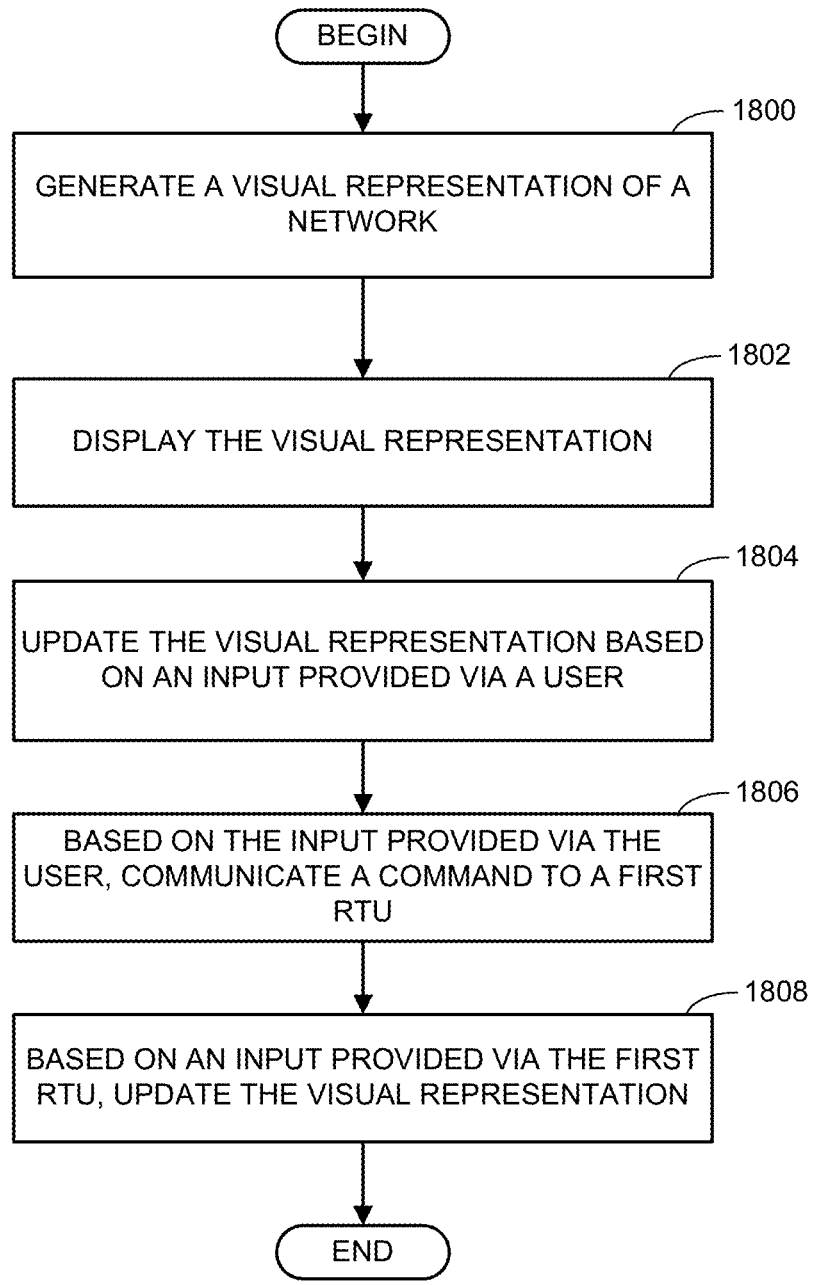
FIG. 18 is a flowchart representative of an example process that may be carried out to control communication within the example network of FIGS. 1 and 2.

FIG. 18 is a flowchart representative of an example process that may be used to control and/or configure communications within a network. The example process begins by generating a visual representation (e.g., the first visual representation 604, the fourth visual representation 1302, etc.) of a network (e.g., the network 102) (block 1800). The network to include a first RTU (e.g., the primary RTU 104) and a second RTU (e.g., the second RTU 106). In some examples, a host (e.g., the host 144) generates the visual representation of the network via a process control configuration application (e.g., ROCLINK™ 800 Configuration Software, etc.). In some examples, the host generates the visual representation based on data communicated to the host via the first RTU. In other examples, the host generates the visual representation based on one or more inputs provided via a user.

In some examples, the host generates the visual representation of the network by generating a first image representative of the first RTU (e.g., the first image 620), a second image representative of the second RTU (e.g., the second image 700), and/or a third image representative of data to be acquired via the first RTU and/or the second RTU (e.g., one of the items 614). In some examples, the host generates a fourth image representative of communication via the first RTU and/or the second RTU (e.g., the fifth image 800).

At block 1802, the visual representation is displayed. The visual representation may be displayed via a computer screen, a portable device (e.g., a laptop, a smart phone, a tablet, etc.), and/or any other display communicatively coupled to the host. At block 1804, the host updates the visual representation based on an input provided via a user (e.g., selection of an image of the visual representation using a mouse, etc.). In some examples, the visual representation is updated by generating an image (e.g., the third image 702, the sixth image 802, the options menu 1000, etc.) based on the input and displaying the visual representation including the image.

In some examples, the visual representation corresponds to communications to be implemented via the network. For example, at block 1806, the host communicates a command to the first RTU based on the input. In some examples, the command instructs the first RTU and/or the second RTU to communicate data within the network corresponding to an image representative of the data to be communicated via the first RTU and/or the second RTU (e.g., the fifth image 800). In some examples, the command includes instructions to the first RTU to discover, commission, and/or decommission one or more RTUs (e.g., based on a user input associated with the third table 1304 and/or the fourth table 1306 of FIG. 13).

At block 1808, based on an input provided via the first RTU, the host updates the visual representation. For example, during operation of the network, the first RTU communicates data (e.g., process variable data, configuration data, status data, alarm data, etc.) associated with one or more of the RTUs in the network to the host. In response, the host updates the visual representation by, for example, generating an image (e.g., the eighth image 1106), displaying an alert (e.g., the first alarm image 900) and/or listing some or all of the data in a table (e.g., status data in the example fourth table 1306 of FIG. 13). After block 1808, the example process of FIG. 18 ends.

Figure 19:
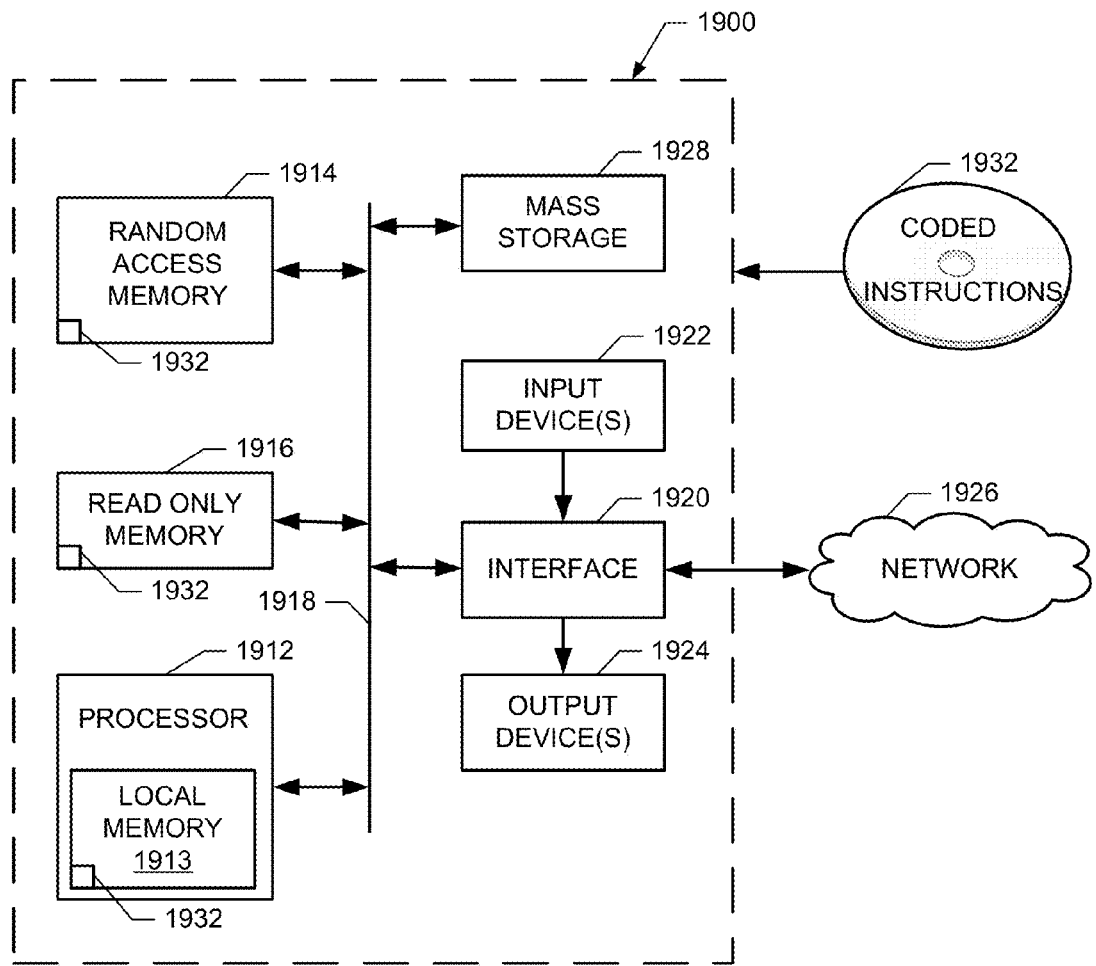
FIG. 19 is a schematic illustration of an example processor platform that may be used and/or programmed to carry out the example processes of FIGS. 14-18 to implement ones of the example RTUs, the example network, and/or, more generally, the example system of FIGS. 1 and 2.

FIG. 19 is a schematic illustration of an example processor platform 1900 that may be used and/or programmed to carry out the example processes of FIGS. 14-18 to implement the example RTU 104, the example network 102, and/or, more generally, the example system 100 of FIGS. 1 and 2. The platform 1900 of the instant example includes a processor 1912. For example, the processor 1912 can be implemented by one or more microprocessors or controllers from any desired family or manufacturer.

The processor 1912 includes a local memory 1913 (e.g., a cache) and is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914 and 1916 is controlled by a memory controller.

The processor platform 1900 also includes an interface circuit 1920. The interface circuit 1920 may be implemented by any type of interface standard, such as an Ethernet interface, a universal serial bus (USB), and/or a PCI express interface. One or more input devices 1922 are connected to the interface circuit 1920. The input device(s) 1922 permit a user to enter data and commands into the processor 1912. The input device(s) can be implemented by, for example, a keyboard, a mouse, a touchscreen, a track-pad, a trackball, isopoint and/or a voice recognition system. One or more output devices 1924 are also connected to the interface circuit 1920. The output devices 1924 can be implemented, for example, by display devices (e.g., a liquid crystal display, a cathode ray tube display (CRT), a printer and/or speakers). The interface circuit 1920, thus, typically includes a graphics driver card.

The interface circuit 1920 also includes a communication device such as a modem or network interface card to facilitate exchange of data with external computers via a network 1926 (e.g., an Ethernet connection, a digital subscriber line (DSL), a telephone line, coaxial cable, a cellular telephone system, etc.).

The processor platform 1900 also includes one or more mass storage devices 1928 for storing software and data. Examples of such mass storage devices 1928 include floppy disk drives, hard drive disks, compact disk drives and digital versatile disk (DVD) drives.

Coded instructions 1932 to implement the example processes of FIG. 14-18 may be stored in the mass storage device 1928, in the volatile memory 1914, in the non-volatile memory 1916, and/or on a removable storage medium such as a CD or DVD.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method comprising:
   allocating, via a processor of a first remote terminal unit, a first time slot of a first frame of a first transmission schedule to the first remote terminal unit, the first remote terminal unit to be in communication with a second remote terminal unit in a network associated with a process control system and to be in communication with a host of the process control system, the first remote terminal unit to communicate first data over the network during the first time slot;
   allocating, via the processor, a second time slot of the first frame to the second remote terminal unit, the second remote terminal unit to communicate second data over the network during the second time slot;
   sending a first request over the network for a third remote terminal unit to provide identification data associated with the third remote terminal unit;
   receiving the identification data from the third remote terminal unit during a time slot of the first transmission schedule randomly selected by the third remote terminal unit; and
   if the randomly selected time slot is during at least one of the first time slot allocated to the first remote terminal unit or the second time slot allocated to the second remote terminal unit, sending the first request over the network a second time.

2. The method of claim 1, wherein if the randomly selected time slot is not during at least one of the allocated first time slot or the allocated second time slot, recording the identification data associated with the third remote terminal unit and communicating a second request over the network requesting other undiscovered remote terminal units to provide corresponding identification data, the second request to include the identification data associated with the third remote terminal unit to instruct the third remote terminal unit not to respond to the second request.

3. The method of claim 1, further comprising commissioning the second remote terminal unit in the network by communicating the first transmission schedule to the second remote terminal unit via the first remote terminal unit and providing instructions to the second remote terminal unit to communicate the second data during the second time slot.

4. The method of claim 1, further comprising generating a second transmission schedule based on the first transmission schedule, the second transmission schedule to be implemented by the second remote terminal unit.

5. The method of claim 4, further comprising commissioning the second remote terminal unit in the network by communicating the second transmission schedule to the second remote terminal unit via the first remote terminal unit.

6. The method of claim 1, wherein the first transmission schedule comprises a second frame, the first remote terminal unit to communicate third data over the network during a third time slot of the second frame and the second remote terminal unit to communicate fourth data over the network during a fourth time slot of the second frame.

7. The method of claim 6, wherein a position of the first time slot of the first frame corresponds to a position of the third time slot of the second frame and a position of the second time slot of the first frame corresponds to a position of the fourth time slot of the second frame.

8. The method of claim 6, wherein the second data communicated during the first frame of the first transmission schedule comprises process variable data obtained from field devices in the process control system, and wherein the fourth data communicated during the second frame comprises at least one of configuration data, diagnostic data, or pass-through data.

9. The method of claim 1, further comprising communicating time data of the first remote terminal unit over the network, via the first remote terminal unit, to enable a clock of the second remote terminal unit to be synchronized with the first remote terminal unit.

10. The method of claim 1, wherein the time slots are allocated based on a total number of remote terminal units in the network to enable the network to cycle through the first transmission schedule within a predetermined time period.

11. The method of claim 1, further comprising communicating over the network, via the first remote terminal unit, instructions to the second remote terminal unit to flash one or more indicator lights on the second remote terminal unit.

12. The method of claim 1, further comprising communicating over the network, via the first remote terminal unit, instructions to the second remote terminal unit to enter a sleep mode during a third time slot of the first frame of the first transmission schedule, wherein the third time slot is not allocated to any device to communicate data.

13. The method of claim 1, wherein if other data is communicated over the network during the randomly selected time slot, resending the first request over the network.

14. An apparatus comprising:
a processor of a first remote terminal unit, the first remote terminal unit to be in communication with a second remote terminal unit in a network associated with a process control system and to be in communication with a host of the process control system, the processor to execute a network interface to enable communications over the network and to execute a network configuration application, the network configuration application to generate a transmission schedule allocating first and second time slots of a first frame of the transmission schedule for the respective first and second remote terminal units, the first remote terminal unit to communicate first data over the network during the first time slot and the second remote terminal unit to communicate second data over the network during the second time slot,
wherein the processor is to execute a discovery application to discover a third remote terminal unit within the network by:
sending a first request over the network for the third remote terminal unit to provide identification data associated with the third remote terminal unit;
receiving the identification data from the third remote terminal unit during a time slot of the transmission schedule randomly selected by the third remote terminal unit; and
if the identification data of the third remote terminal unit is communicated over the network when at least one of the first data allocated to the first time slot or the second data allocated to the second time slot is communicated, sending the first request over the network a second time.

15. The apparatus of claim 14 further comprising a high-speed communications interface to communicatively couple the processor to the first remote terminal unit.

16. The apparatus of claim 15, wherein the high-speed communications interface is to communicate data via at least one of a backplane, a universal serial bus cable, a circuit board trace, or an Ethernet cable.

17. The apparatus of claim 14, wherein if the identification data is communicated when none of the first data allocated to the first time slot and the second data allocated to the second time is communicated, the processor is to execute the discovery application by recording the identification data associated with the third remote terminal unit and communicating a second request over the network requesting other undiscovered remote terminal units to provide corresponding identification data, the second request to include the identification data associated with the third remote terminal unit to instruct the third remote terminal unit not to respond to the second request.

18. The apparatus of claim 14, wherein the processor is to execute a commissioning application, the commissioning application to commission the second remote terminal unit in the network by communicating the transmission schedule to the second remote terminal unit via the network interface and providing instructions to the second remote terminal unit to communicate the second data during the second time slot.

19. The apparatus of claim 14, wherein the processor is to generate a second transmission schedule based on the transmission schedule, the second transmission schedule to be implemented by the second remote terminal unit.

20. The apparatus of claim 19, wherein the processor is to execute a commissioning application, the commissioning application to commission the second remote terminal unit in the network by communicating the second transmission schedule to the second remote terminal unit via the first remote terminal unit.

21. The apparatus of claim 14, wherein the transmission schedule comprises a second frame, the first remote terminal unit to communicate third data over the network during a third time slot of the second frame and the second remote terminal unit to communicate fourth data over the network during a fourth time slot of the second frame.

22. The apparatus of claim 21, wherein positions of the first and second time slots of the first frame correspond to positions of the third and fourth time slots of the second frame, respectively.

23. The apparatus of claim 21, wherein the second data communicated during the first frame of the transmission schedule comprises process variable data obtained from field devices in the process control system, and wherein the fourth data communicated during the second frame comprises at least one of configuration data, diagnostic data, or pass-through data.

24. The apparatus of claim 14, wherein the first remote terminal unit is to communicate time data over the network to enable a clock of the second remote terminal unit to be synchronized with the first remote terminal unit.

25. The apparatus of claim 14, wherein the time slots are allocated based on a total number of remote terminal units in the network to enable the network to cycle through the transmission schedule within a predetermined time period.

26. The apparatus of claim 14, wherein the network is a wireless network.

27. The apparatus of claim 14, wherein if other data is communicated over the network during the randomly selected time slot, the processor is to execute the discovery application by resending the first request over the network.

28. A tangible computer readable medium comprising instructions that, when executed, cause a machine to at least:
allocate a first time slot of a first frame of a transmission schedule to a first remote terminal unit, the first remote terminal unit in communication with a second remote terminal unit in a network of a process control system and in communication with a host of the process control system, the first remote terminal unit to communicate first data over the network during the first time slot;

allocate a second time slot of the first frame to the second remote terminal unit, the second remote terminal unit to communicate second data over the network during the second time slot; and discover a third remote terminal unit by:
sending a first request over the network for the third remote terminal unit to provide identification data associated with the third remote terminal unit;
receiving the identification data from the third remote terminal unit during a time slot of the transmission schedule randomly selected by the third remote terminal unit; and
if the identification data of the third remote terminal unit is communicated over the network when at least one of the first data allocated to the first time slot of the second data allocated to the second time slot is communicated, sending the first request over the network a second time.

29. The computer readable medium of claim 28, wherein if the identification data is communicated when none of the first data allocated to the first time slot and the second data allocated to the second time slot is communicated, the instructions, when executed, further cause the machine to record the identification data associated with the third remote terminal unit and communicate a second request over the network requesting other undiscovered remote terminal units to provide corresponding identification data, the second request to include the identification data associated with the third remote terminal unit to instruct the third remote terminal unit not to respond to the second request.

30. The computer readable medium of claim 28, wherein the transmission schedule comprises a second frame, the first remote terminal unit to communicate additional data over the network during a third time slot of the second frame and the second remote terminal unit to communicate additional data over the network during a fourth time slot of the second frame.

31. The computer readable medium of claim 28, wherein the data communicated during the first frame of the transmission schedule comprises process variable data obtained from field devices in the process control system, and wherein the additional data communicated during the second frame comprises at least one of configuration data, diagnostic data, or pass-through data.

32. The computer readable medium of claim 30, wherein the instructions, when executed, further cause the machine to communicate time data of the first remote terminal unit over the network to enable a clock of the second remote terminal unit to be synchronized with the first remote terminal unit.

33. The computer readable medium of claim 30, wherein the time slots are allocated based on a total number of remote terminal units in the network to enable the network to cycle through the transmission schedule within a predetermined time period.

34. The computer readable medium of claim 28, wherein if other data is communicated over the network during the randomly selected time slot, the instructions, when executed, further cause the machine to resend the first request over the network.

* * * * *